US011013169B2

(12) United States Patent
Nilson et al.

(10) Patent No.: US 11,013,169 B2
(45) Date of Patent: May 25, 2021

(54) APPARATUS FOR PROCESSING A CROP

(71) Applicant: Crary Industries, Inc., West Fargo, ND (US)

(72) Inventors: Michael A. Nilson, West Fargo, ND (US); Luke A. Baker, Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 596 days.

(21) Appl. No.: 14/810,266

(22) Filed: Jul. 27, 2015

(65) Prior Publication Data
US 2016/0050845 A1   Feb. 25, 2016

Related U.S. Application Data

(63) Continuation-in-part of application No. 14/595,374, filed on Jan. 13, 2015, now abandoned.

(60) Provisional application No. 61/926,654, filed on Jan. 13, 2014.

(51) Int. Cl.
| | | |
|---|---|---|
| *A01D 17/00* | (2006.01) | |
| *A01D 33/08* | (2006.01) | |
| *A01D 17/10* | (2006.01) | |
| *A01D 33/02* | (2006.01) | |

(52) U.S. Cl.
CPC .......... *A01D 17/00* (2013.01); *A01D 17/10* (2013.01); *A01D 33/02* (2013.01); *A01D 33/08* (2013.01)

(58) Field of Classification Search
CPC ........ A01D 17/00; A01D 17/02; A01D 17/04; A01D 17/06; A01D 17/08; A01D 33/02

USPC ..................................................... 171/14, 17
See application file for complete search history.

(56) References Cited

U.S. PATENT DOCUMENTS

| | | | | | |
|---|---|---|---|---|---|
| 1,347,733 | A | * | 7/1920 | Davis ..................... | A01D 33/06 |
| | | | | | 56/158 |
| 1,800,622 | A | * | 4/1931 | Granberg ............... | A01D 17/00 |
| | | | | | 171/127 |
| 1,975,668 | A | * | 10/1934 | Rodin .................... | A01D 17/10 |
| | | | | | 171/14 |
| 2,612,993 | A | * | 10/1952 | Levesque ............... | A01D 33/08 |
| | | | | | 171/126 |
| 2,657,798 | A | * | 11/1953 | Young .................... | A01D 33/02 |
| | | | | | 209/616 |

(Continued)

*Primary Examiner* — Thomas B Will
*Assistant Examiner* — Joel F. Mitchell
(74) *Attorney, Agent, or Firm* — Wood, Phillips, Katz, Clark & Mortimer

(57) ABSTRACT

An apparatus for processing agricultural product having a main frame, a support for the main frame configured so that the main frame can be advanced in an operating direction over an area in which agricultural product is grown, and an operating system on the main frame configured to advance unearthed agricultural product intermixed with debris in a conveying direction in a conveying path between an input location and a first point of use. A first processing assembly a) advances unearthed agricultural product intermixed with debris in the conveying direction towards the first point of use; and b) allows intermixed debris to separate from the agricultural product as it is advanced in the conveying direction. A plurality of processing assemblies downstream of the first processing assembly separate intermixed debris in the form of vines from the agricultural product in different manners as the agricultural product is advanced in the conveying direction.

34 Claims, 12 Drawing Sheets

(56) References Cited

U.S. PATENT DOCUMENTS

| | | | | |
|---|---|---|---|---|
| 2,777,266 | A * | 1/1957 | Middleton et al. | A01D 17/10 171/130 |
| 3,098,338 | A * | 7/1963 | Myers | A01D 34/17 56/296 |
| 3,128,485 | A * | 4/1964 | Bradshaw et al. | A23N 12/023 15/3.14 |
| 3,227,276 | A * | 1/1966 | Leighton et al. | A01D 33/08 171/14 |
| 3,295,300 | A * | 1/1967 | Yeske | A01D 34/13 56/296 |
| 3,581,747 | A * | 6/1971 | Scribner | A01D 33/00 460/130 |
| 3,656,488 | A * | 4/1972 | Dumanowski et al. | A01D 33/08 171/14 |
| 3,664,103 | A * | 5/1972 | McNair | A01D 34/13 56/298 |
| 4,287,707 | A * | 9/1981 | Persoons et al. | A01D 45/22 209/137 |
| 4,364,222 | A * | 12/1982 | Ramacher | A01D 51/002 209/139.1 |
| 4,971,155 | A * | 11/1990 | Peturis | A01D 21/00 171/11 |
| 5,107,664 | A * | 4/1992 | Ross et al. | A01D 23/02 171/17 |
| 5,363,634 | A * | 11/1994 | Saito | A01D 23/04 171/17 |
| 5,573,459 | A * | 11/1996 | Meester | A01D 45/006 460/145 |
| 7,789,166 | B2 * | 9/2010 | Wallace | A01D 33/10 171/138 |

\* cited by examiner

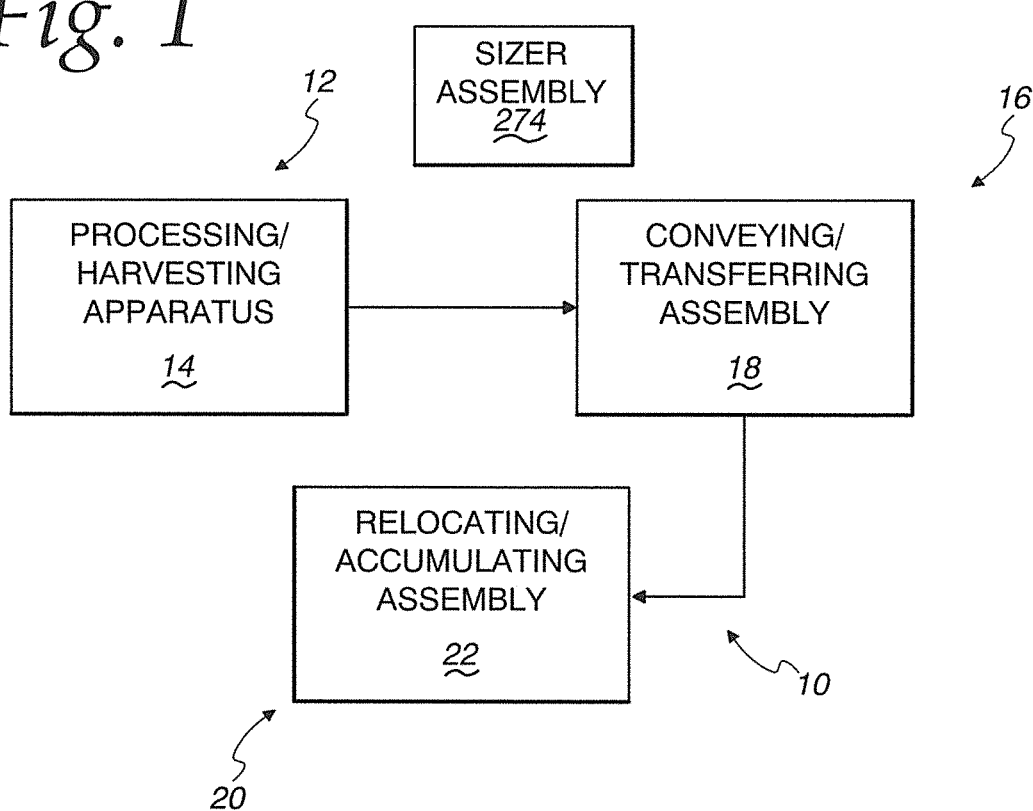
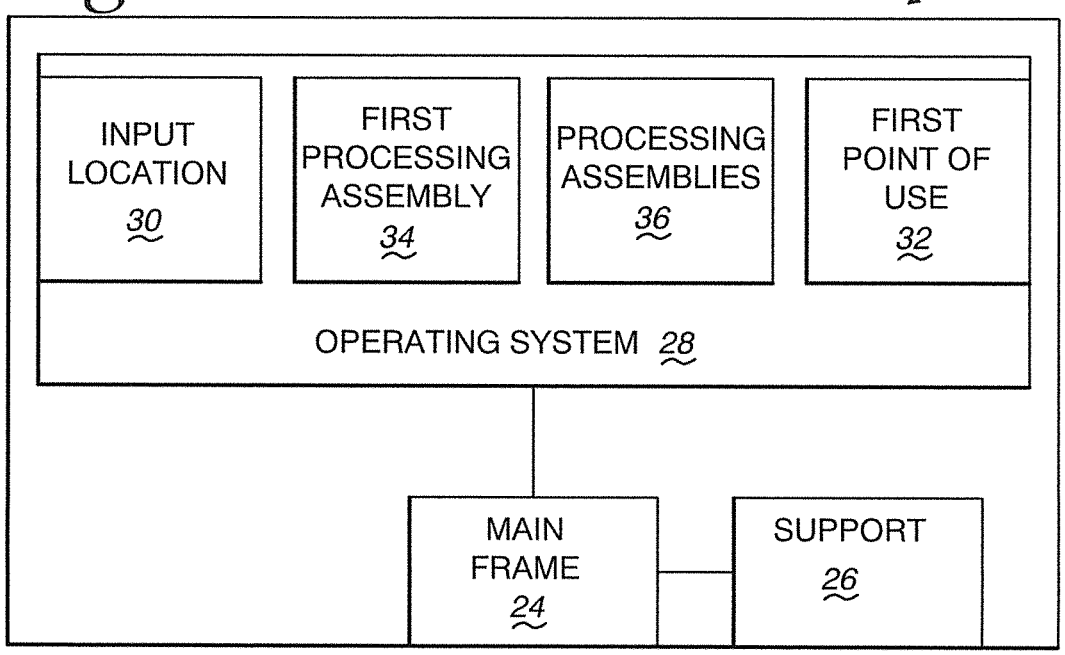

APPARATUS FOR PROCESSING A CROP

BACKGROUND OF THE INVENTION

Field of the Invention

This invention relates to agricultural product/crop harvesting and, more particularly, to an apparatus that continuously removes debris from the agricultural product/crop after it is unearthed.

Background Art

Crop harvesting technology continues to evolve to this day. Designers of harvesting equipment are guided by a number of different objectives.

First of all, harvesting equipment must be adaptable to different crop processing volume. At the same time, the equipment must be affordable to warrant an initial investment by operations with significantly different volume demands. Affordability has a number of different aspects. First of all, the initial equipment investment must be one that can be borne based upon anticipated profits. Affordability hinges largely upon the minimization of investment of man hours in terms of operating and maintaining the equipment, as well as monitoring and assisting the mechanically performed harvesting operations. Failure resulting in down time during a short harvesting season can have a damaging or devastating effect on agricultural operations.

To meet the above objectives, crop harvesting equipment must be able to efficiently unearth usable crop without damage thereto, effectively separate vines and other debris therefrom, and stage the usable crop for accumulation, transportation to an appropriate site, or other subsequent handling.

Crops such as potatoes, and particularly sweet potatoes, present a particular processing challenge. Vines, soil with different composition, clay, stones, and other debris must be separated from the potatoes, ideally with a minimal amount of manual intervention. Vines are particularly a problem since they tend to adhere tenaciously to potatoes. As a result, workers may have to spend a considerable amount of time assisting the debris separation as harvesting equipment is advanced and/or after the harvested usable crop is accumulated either on the equipment or elsewhere in the field, such as in a staging container. The industry continues to seek out equipment that is capable of more effectively and efficiently separating debris, and particularly vines. However, particularly in the case of potato crops, additional improvements would be particularly advantageous.

Heretofore, the handling of the usable crop after harvest has presented its own challenges. One existing technique involves distributing cleaned crop directly in the field progressively as the harvesting equipment is advanced. For this technique, individual workers are required to accumulate the crop, as in totes, which may be placed strategically in a field for ultimate pick-up by a vehicle with high volume handling capability.

In an alternative technique, a single container may accumulate a relatively large volume of clean crop, which is eventually separated into smaller totes for handling. Aside from requiring a significant amount of work and intervention, this latter technique is undesirable by reason of the mass accumulation of the crop. Under its own weight, the crop is prone to being damaged. Commonly, accumulation of crop, such as potatoes, is done in a manner that causes damage to be inflicted on a significant percentage of a total harvest. This damage may reduce crop value and, in a worst case, require disposal of a significant quantity of the damaged crop.

Given the highly competitive nature of the agricultural industry, harvesting operations are challenged to maximize profit. This requires a balancing of many of the above objectives, which at times compete with each other. For example, while debris separation and handling of clean crop with minimal damage is most effectively carried out by manual labor, labor cost makes the use of a large force impractical.

In spite of the challenges that have been faced by the agricultural industry for decades, the current harvesting technology still faces many challenges that might be addressed or overcome by still further equipment improvement.

SUMMARY OF THE INVENTION

The invention is directed to an apparatus for processing agricultural product. The apparatus has a main frame, a support for the main frame configured so that the main frame can be advanced in an operating direction over an area in which agricultural product is grown, and an operating system on the main frame. The operating system is configured to advance unearthed agricultural product intermixed with the debris in a conveying direction in a conveying path between an input location and a first point of use. The operating system has a first processing assembly that is configured to: a) advance unearthed agricultural product intermixed with debris in the conveying direction towards the first point of use; and b) allow debris intermixed with the agricultural product to separate from the agricultural product as it is advanced in the conveying direction. The operating system further has a plurality of processing assemblies downstream of the first processing assembly and configured to separate intermixed debris in the form of vines from the agricultural product in different manners as the agricultural product is advanced in the conveying direction between the first processing assembly and the first point of use.

In one form, the plurality of processing assemblies includes a processing assembly with at least one elongate blade with a length extending transversely to the conveying path. The at least one elongate blade is configured to: a) engage vines intermixed with the conveying agricultural product; and b) inhibit movement of the engaged vines as the agricultural product continues to advance in the conveying direction.

In one form, the at least one elongate blade is in the form of a flat vane that resides substantially in a plane through which the conveying path extends.

In one form, the plurality of processing assemblies includes a processing assembly with: (a) a support surface configured to: i) support vines intermixed with the agricultural product so that the agricultural product is suspended by the vines on the support surface to reside beneath the support surface; and ii) to move so as to advance the vines with the suspended agricultural product in the conveying direction; and (b) at least one elongate bar with a length extending transversely to the conveying path. The at least one elongate bar is configured to engage the vines at a location beneath the support surface as the support surface moves to thereby reposition the vines to engage the suspended agricultural product and exert a force upon the suspended agricultural product tending to separate it from the vines.

In one form, the plurality of processing assemblies includes a processing assembly having: (a) a support surface configured to: i) support vines intermixed with the agricultural product so that the agricultural product is suspended by the vines on the support surface; and ii) move so as to advance the vines with the suspended agricultural product in the conveying direction; and (b) first and second components that create a pinch region at which a force is exerted tending to separate the suspended agricultural product from the vines.

In one form, one of the first and second components is configured to be biased towards the other first and second components.

In one form, the first and second components each is elongate with a length extending transversely to the conveying path.

In one form, the first and second components each is in the form of a generally cylindrical roller with an outside diameter and the outside diameters of the first and second components are different.

In one form, the plurality of processing assemblies includes a processing assembly having a fluid delivery system configured to direct a pressurized supply of fluid against agricultural product advancing towards the first point of use.

In one form, the first processing assembly has a plurality of elongate rods in spaced relationship that cooperatively define a support surface for unearthed agricultural product intermixed with debris. The first processing assembly is further configured so that the plurality of elongate rods is moved to advance supported unearthed agricultural product intermixed with debris in the conveying direction and so that separated debris can move under its weight downwardly through spaces between the elongate rods.

In one form, the first processing assembly further includes a shaker assembly that is configured to impart at least one of: (a) a wave; and (b) a vibrational movement to the moving elongate rods.

In one form, the first processing assembly further includes at least a first blade that is configured to penetrate soil and unearth agricultural product that is rooted in the soil as the main frame is advanced in an operating direction.

In one form, the first processing assembly has a subframe upon which the at least first blade and plurality of elongate rods are supported. The subframe and main frame are configured so that the subframe can be selectively moved relative to the main frame in a predetermined manner to change an orientation of the support surface.

In one form, the at least first blade and subframe are configured so that the at least first blade can be moved selectively relative to the subframe to thereby change at least one of: (a) a height; and (b) and angular orientation of the at least first blade relative to the subframe.

In one form, the apparatus further has a surface reconfiguring assembly that is configured to interact with the plurality of moving elongate rods over a travel portion for supported agricultural products to cause the moving rods to at least one of: (a) locally change direction of movement; and (b) change in relationship to each other to thereby change the spacing between the elongate rods from a spacing between the elongate rods upstream of the surface reconfiguring assembly.

In one form, the surface reconfiguring assembly is configured so that a relationship between the plurality of elongate rods over the travel portion can be selectively varied.

In one form, the operating system has an upper support surface and a lower support surface below the upper support surface. Each of the upper and lower support surfaces is configured to support agricultural product to be advanced towards the first point of use. The upper and lower support surfaces are coextensive over at least a portion of the lengths thereof along the conveying direction and diverge in a downstream direction.

In one form, the upper and lower surfaces are each defined by an endless assembly, each traveling in a predetermined path. The endless assemblies engage each other over a portion of their endless paths.

In one form, the operating system has a plurality of endless assemblies that each moves a predetermined endless path. The plurality of endless assemblies cooperatively define support surfaces that advance agricultural product between the input location and first point of use.

In one form, there are separate shaker assemblies that interact with at least one of: a) a same one of the endless assemblies; and b) different ones of the endless assemblies at locations spaced in the conveying direction. The shaker assemblies each is configured to impart at least one of: i) a wave; and ii) a vibrational movement to the support surface on a respective endless assembly.

The apparatus may be provided in combination with a cross conveying assembly at the first point of use that is configured to direct agricultural product delivered to the first point of use to a second point of use.

In one form, the plurality of processing assembly includes a processing assembly with a fluid delivery system configured and located to direct a pressurized supply of fluid against agricultural product as the agricultural product is being delivered to the cross conveying assembly.

In one form, the operating system has a moving support surface for agricultural product intermixed with debris that causes intermixed debris separated from the agricultural product to be advanced past the cross conveying assembly.

In another form, the plurality of processing assemblies consists of: a) a first processing assembly having at least one elongate blade with a length extending transversely to the conveying path and configured to: i) engage vines intermixed with the conveying agricultural product; and ii) inhibit movement of the engaged vines as the agricultural product continues to advance in the conveying direction; b) a second processing assembly having: i) a support surface configured to: A) support vines intermixed with agricultural products so that the agricultural products are suspended by the vines and the support surface; and B) move so as to advance the vines with the suspended agricultural product in the conveying direction; and ii) first and second components that create a pinch region at which a force is exerted tending to separate the suspended agricultural product from the vine; (c) a third processing assembly having: i) a support surface configured to: A) support vines intermixed with the agricultural product so that the agricultural product is suspended by the vines on the support surface to reside beneath the support surface; and B) move so as to advance the vines with the suspended agricultural product in the conveying direction; and ii) at least one elongate bar with a length extending transversely to the conveying path and configured to engage the vines at a location beneath the support surface as the support surface moves to thereby reposition the vines to engage the suspended agricultural product and exert a force upon the suspended agricultural product tending to separate the suspended agricultural product from the vines; and (d) a fourth processing assembly having a fluid delivery system configured to direct a pressurized supply of fluid against the agricultural product advancing towards the first point of use.

The invention is further directed to a method of processing agricultural product by performing the steps of: obtaining the apparatus as described above; advancing the main frame in an operating direction to thereby cause in-ground agricultural product to be unearthed with intermixed debris including vines; progressively separating the debris from the agricultural product through the first and plurality of processing assemblies as the agricultural product intermixed with debris is advanced from the input location to the first point of use; and causing the agricultural product with the intermixed debris separated by the first and plurality of processing assemblies to be delivered to the first point of use.

In one form, the agricultural product is in the form of potatoes.

In one form, the agricultural product is in the form of sweet potatoes.

BRIEF DESCRIPTION OF THE DRAWINGS

FIG. 1 is a schematic representation of a system for processing agricultural product/crop, according to the present invention, including a cooperating: processing/harvesting apparatus; conveying/transferring assembly; and relocating/accumulating assembly;

FIG. 2 is a schematic representation showing further details of the processing/harvesting apparatus in FIG. 1;

DETAILED DESCRIPTION OF THE PREFERRED EMBODIMENT

Figure 3:
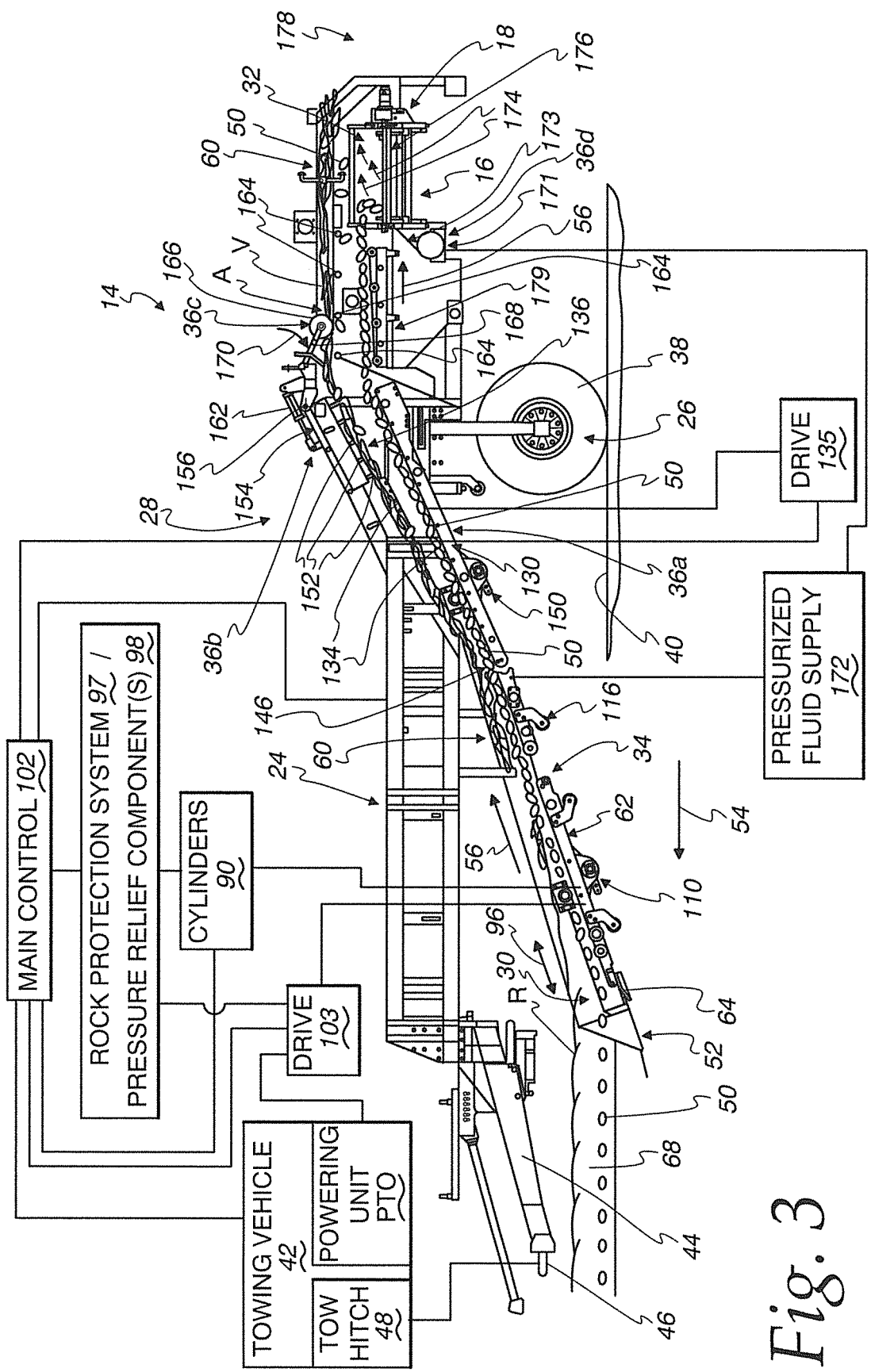
FIG. 3 is a side elevation view of one specific form of processing/harvesting apparatus and conveying/transferring assembly, as shown in schematic form in FIGS. 1 and 2.
Figure 4:
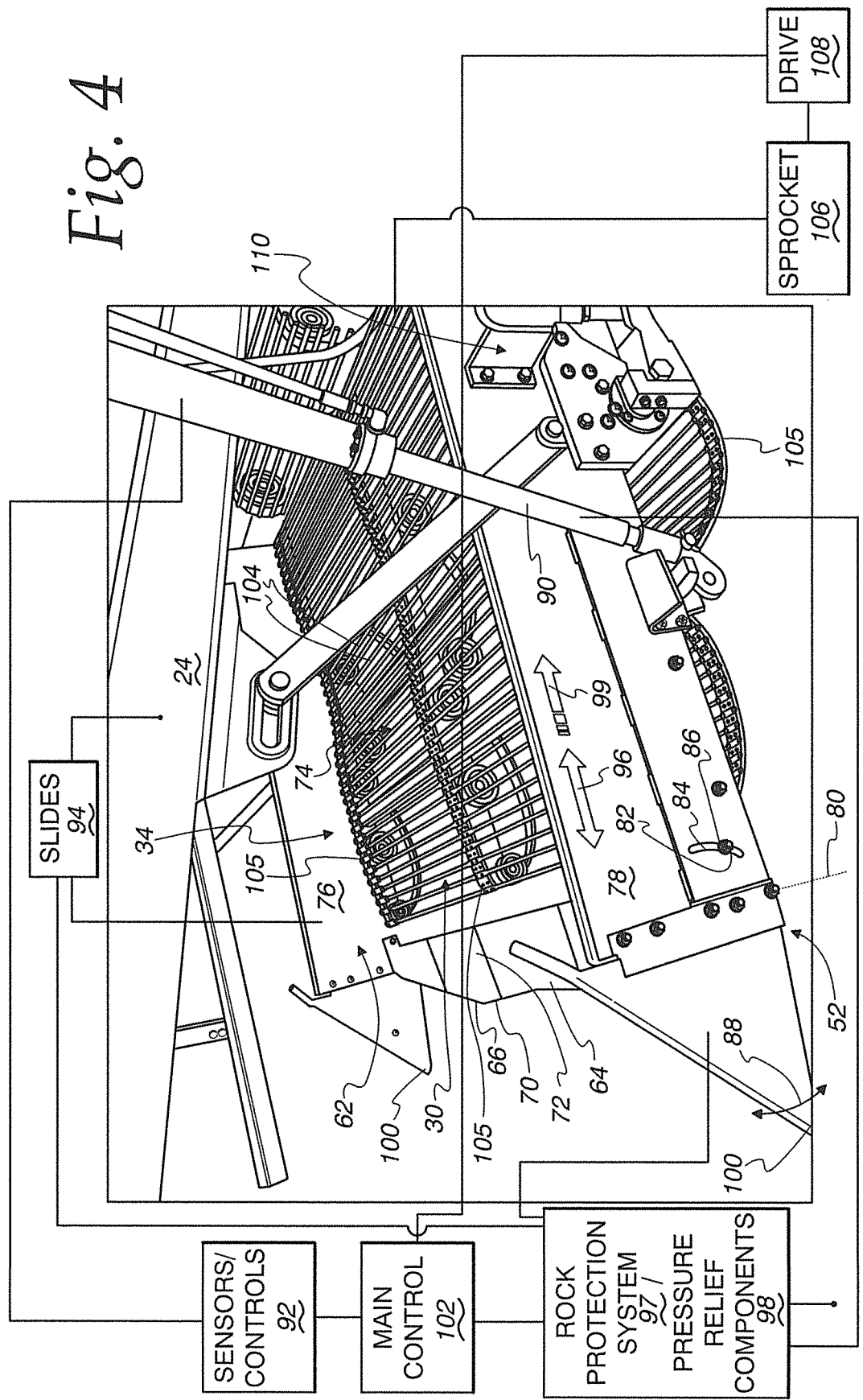
FIG. 4 is an enlarged, fragmentary, perspective view of an initial processing assembly on the processing/harvesting apparatus in FIG. 3.
Figure 5:
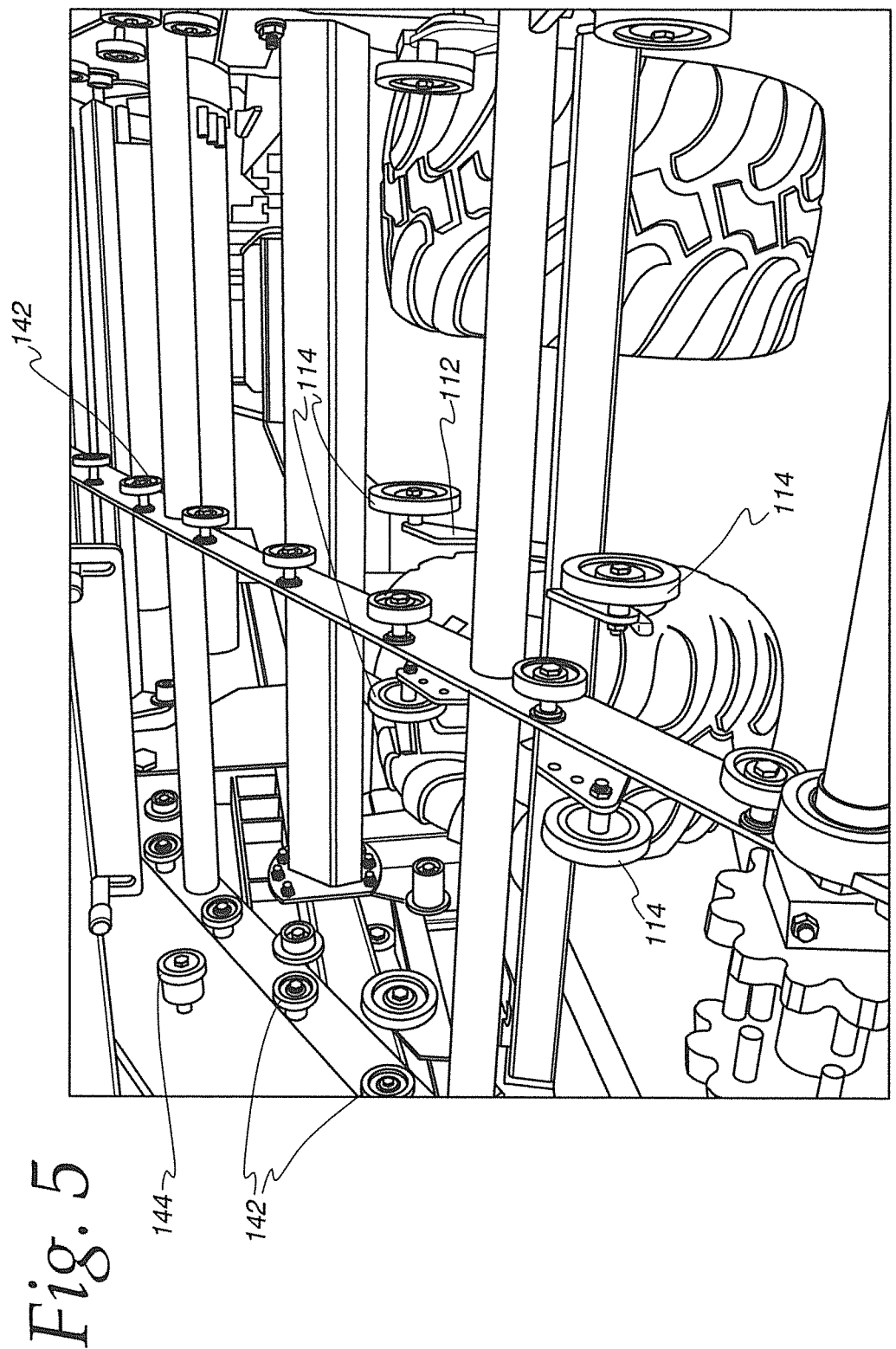
FIG. 5 is an enlarged, fragmentary view of the processing assembly in FIG. 4, with a conveying assembly thereon removed, and taken from a different perspective than in FIG. 4.
Figure 6:
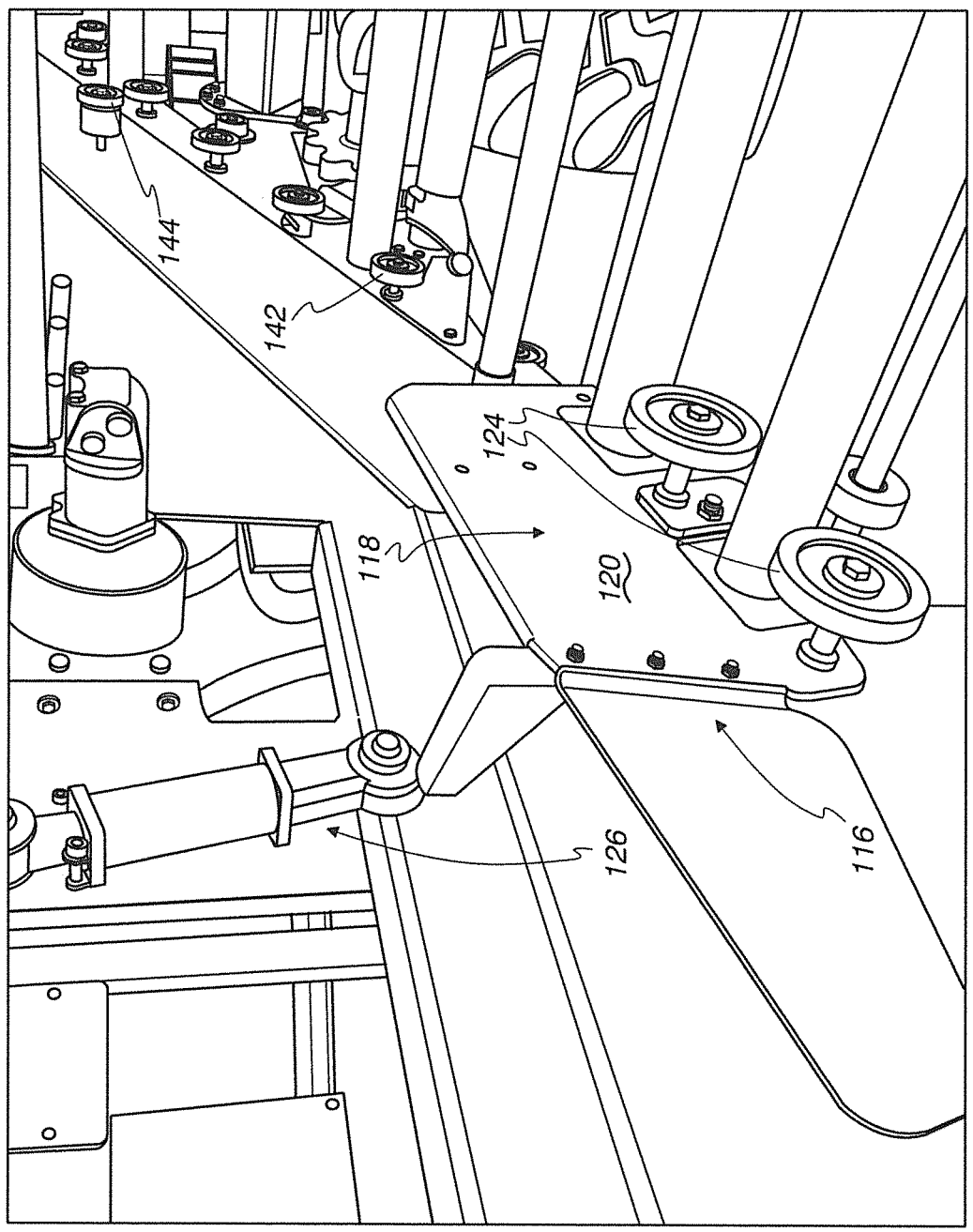
FIG. 6 is a view generally as in FIG. 5 and showing a transition location between the processing assembly and a further downstream processing assembly.
Figure 7:
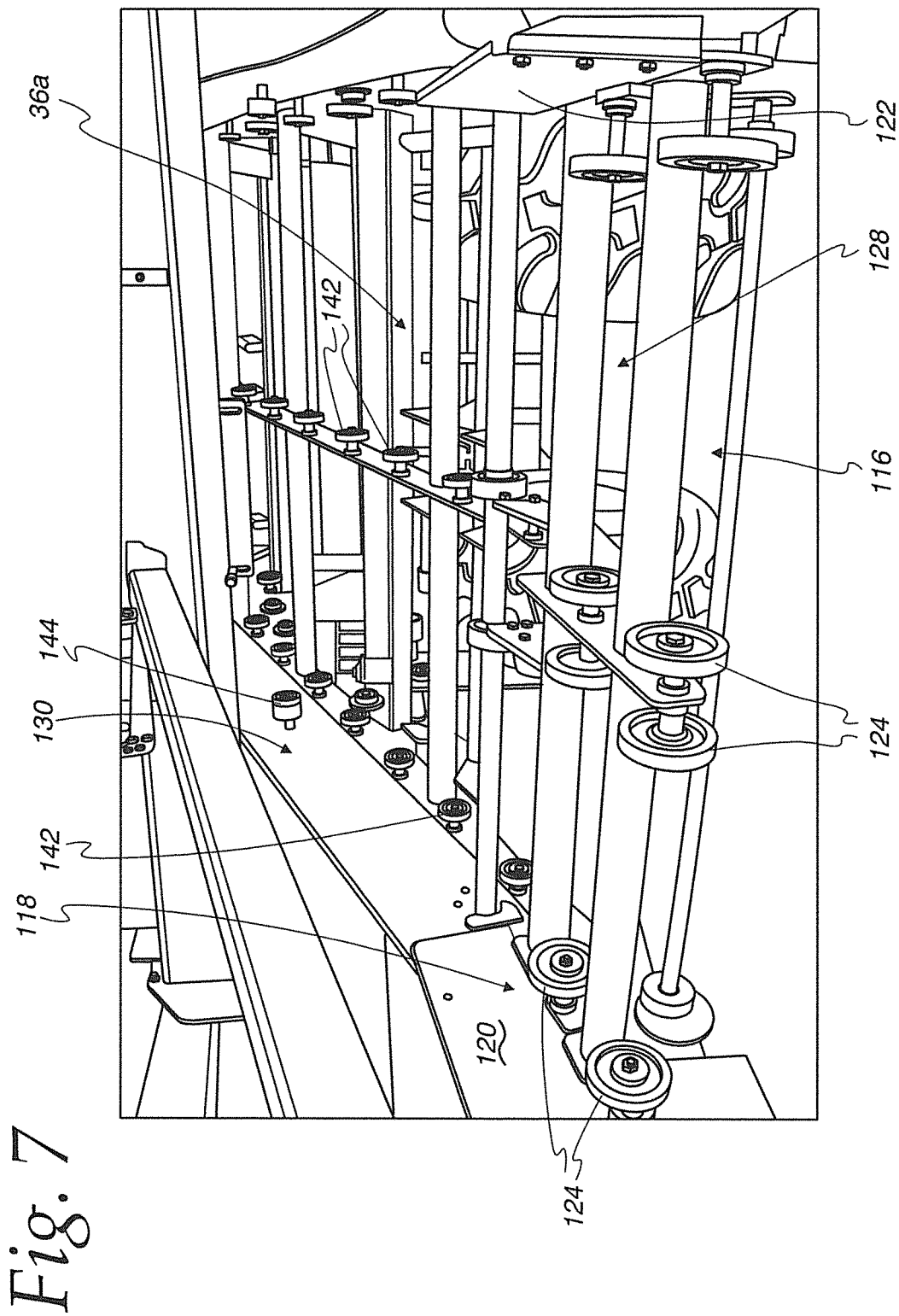
FIG. 7 is a view generally as in FIG. 5 and showing additional components on the processing assemblies.
Figure 8:
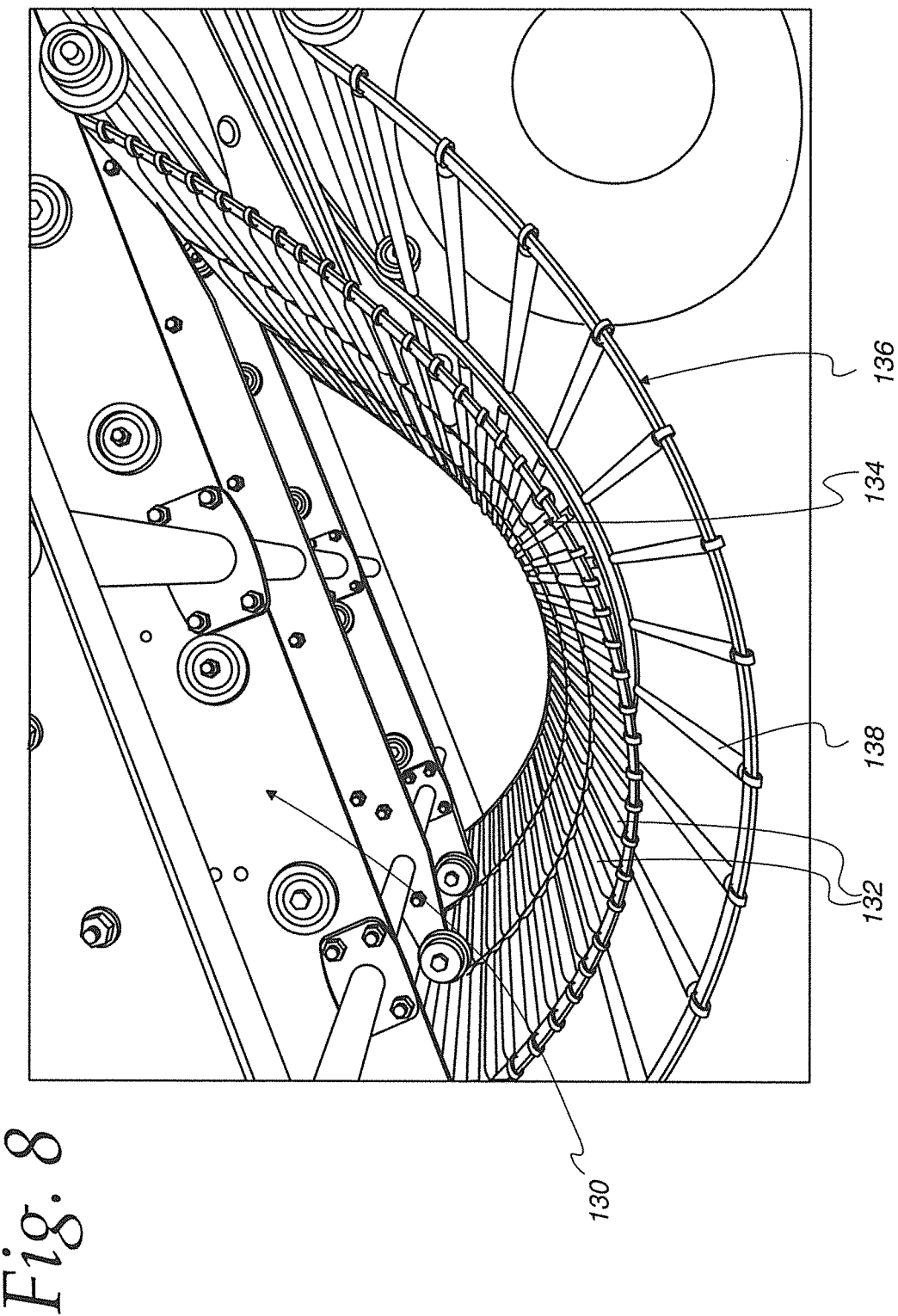
FIG. 8 is an enlarged, fragmentary, perspective view of a bottom region of the downstream processing assembly showing two endless conveyor assemblies that cooperate to remove debris and perform a devining operation.
Figure 9:
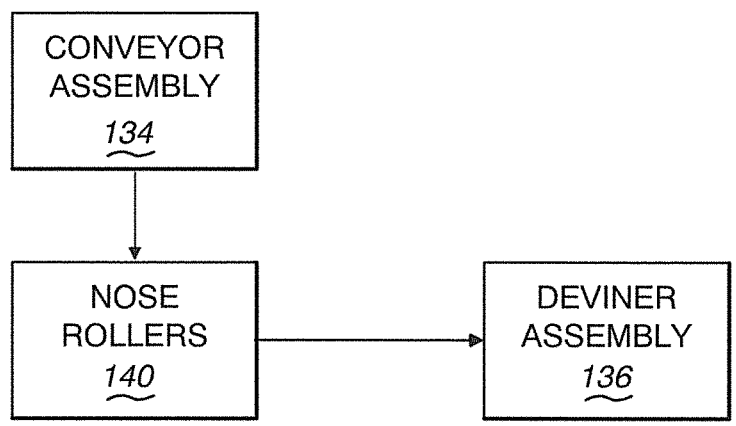
FIG. 9 is a schematic representation of the two separate assemblies in FIG. 8 as they cooperate with nose rollers.
Figure 10:
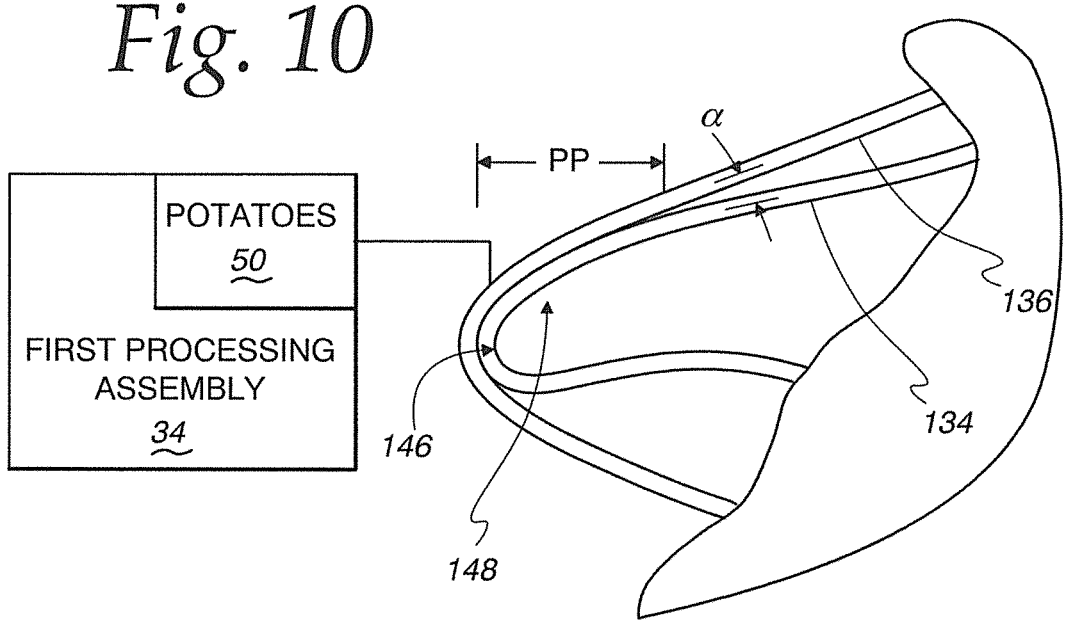
FIG. 10 is a schematic representation of the two endless conveyor assemblies in FIGS. 8 and 9 and showing where the conveyor assemblies interact at an upstream region thereof.
Figure 11:
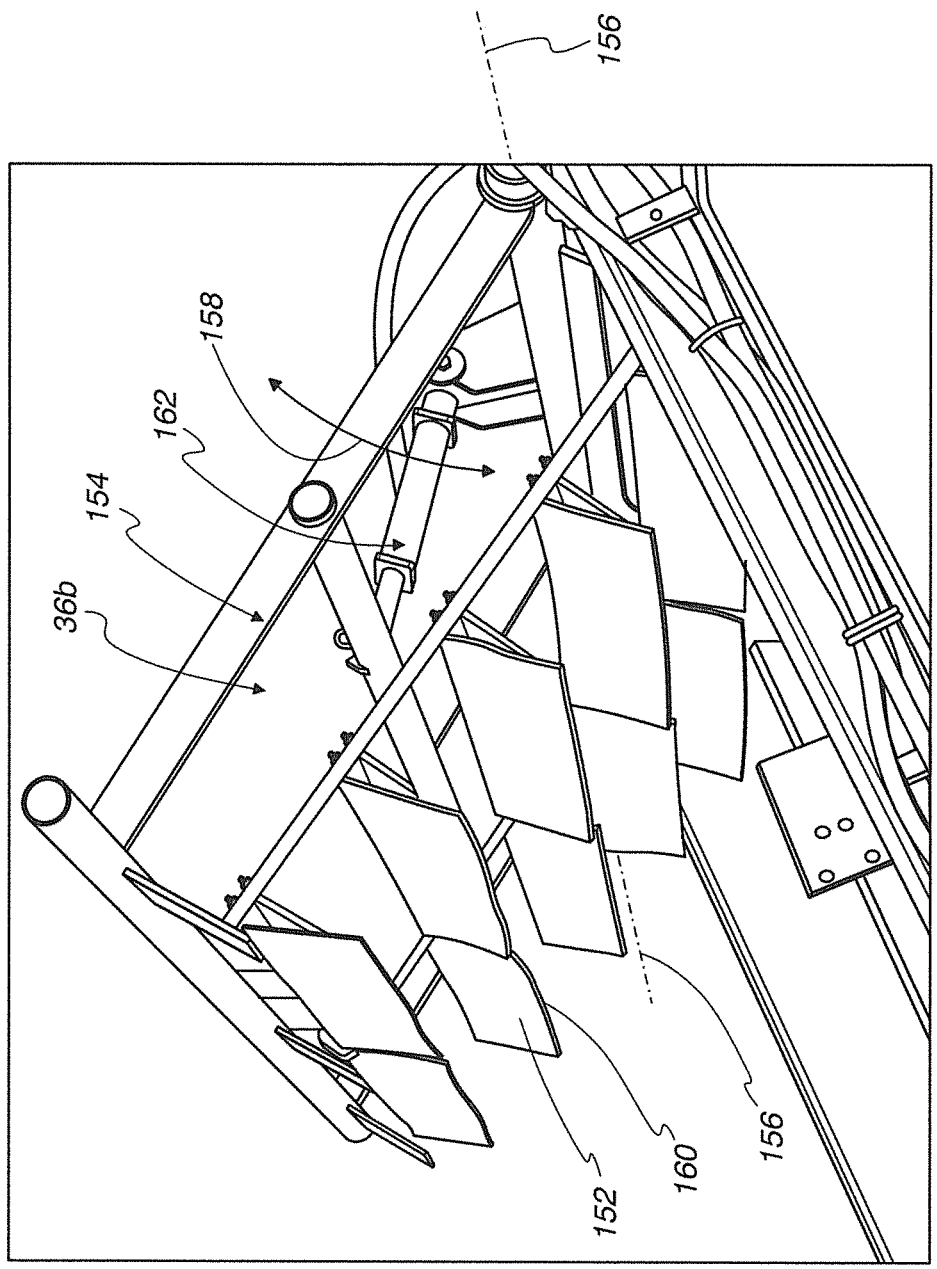
FIG. 11 is an enlarged, fragmentary, perspective view of a further processing assembly on the processing/harvesting apparatus including vanes that intercept vines.

A system for processing agricultural products/crops, according to the present invention, is shown in schematic form at 10 in FIG. 1. The system 10 consists of three different stages: a) a first stage at 12 which utilizes a processing/harvesting apparatus 14; b) a second stage at 16 that utilizes a conveying/transferring assembly 18; and c) a third stage at 20 that utilizes a relocating/accumulating assembly 22.

A more detailed construction of the processing/harvesting apparatus 14 in FIG. 1 is shown in schematic form in FIG. 2. The processing/harvesting apparatus 14 has a main frame 24 and a support at 26 for the main frame 24 that is configured so that the main frame 24 can be advanced in an operating direction over an area in a field in which agricultural product to be harvested is grown.

An operating system 28 is provided on the main frame 24 and is configured to advance unearthed agricultural product intermixed with debris in a conveying direction in a conveying path between an input location 30 and a first point of use 32.

The operating system further includes a first processing assembly/crop processor 34 that is configured to: a) advance unearthed agricultural product intermixed with debris in the conveying direction towards the first point of use 32; and b) allow debris intermixed with the agricultural product to separate from the agricultural product as it is advanced in the conveying direction.

The operating system 28 further includes a plurality of additional processing assemblies 36 downstream of the first processing assembly 34 configured to separate intermixed debris, including debris in the form of vines, from the agricultural product in different manners as the agricultural product is advanced in the conveying direction between the first processing assembly 34 and the first point of use 32.

The schematic showing of the processing/harvesting apparatus 14 in FIG. 2 is intended to encompass the particular construction, as depicted and described hereinbelow, as well as virtually an unlimited number of variations of the individual components depicted, and different interactions therebetween. The specific embodiments herein are intended to be only exemplary in nature. One specific form of the processing/harvesting apparatus 14 will now be described with respect to FIGS. 3-14.

The system 10 will be described hereinbelow as it is used to harvest agricultural product in the form of potatoes—either white or sweet. It should be understood that the inventive concepts can be used to process other crops in similar manner.

The support 26 for the main frame 24 on the apparatus 14 is in the form of a wheeled chassis. A plurality of wheels 38 on the chassis roll against an underlying field surface 40 between planted rows R as the main frame 24 is advanced by a towing vehicle 42. The main frame 24 has a cantilevered tongue 44 with a coupling component 46 thereon that can be releasably engaged with a conventional type hitch 48 on the towing vehicle 42.

The first processing assembly 34 is depicted as the processing assembly that initially receives agricultural product/crop (hereinafter a representative potato crop) 50 after it is unearthed by a leading digging assembly 52 as the apparatus 14 is advanced by the towing vehicle 42 in the operating direction, indicated by the arrow 54 in FIG. 3.

The additional processing assemblies/crop processors 36 include, in this particular embodiment, four processing assemblies 36a, 36b, 36c, 36d. Each processing assembly 36a, 36b, 36c, 36d is downstream of the first processing assembly 34 as the components in the operating system 28, including the processing assemblies 34, 36, advance unearthed potatoes 50 intermixed with debris in the conveying path in the conveying direction, as indicated by the arrows 56. The conveying path extends from the input location 30, at the upstream end of the first processing assembly 34, to the first point of use at 32. As depicted, the point of use 32 is part of the conveying/transferring assembly 18 making up the second stage 16. However, the first point of use 32 may be any other location at which the potatoes 50 are further processed or staged.

Generally, the processing assemblies 36a, 36b, 36c, 36d, are configured to progressively strip and separate debris 60, including vines V, from the conveying potatoes 50 in different manners. The first processing assembly 34 and processing assembly 36a are configured to remove primarily soil and small debris, such as rocks. The processing assemblies 36b, 36c are configured primarily to facilitate separation of the potatoes 50 from other debris 60, particularly in vine form. The processing assembly 36d is configured to effect a final separation of any remaining debris adhered to the potatoes 50 and additionally facilitates the controlled delivery of the potatoes 50 stripped of debris 60 to the first point of use 32, as depicted in the form of a component on the conveying/transferring assembly 18.

Details of the digging assembly 52 and various processing assemblies 34, 36 will now be described.

The digging assembly 52 is integrated into a subframe 62 upon which the components making up the first processing assembly 34 are operatively supported. A conventional type blade 64, identified as a "semi-clod blade", is formed to define laterally spaced, pointed, dished out shapes at 66 (one shown) that will align to penetrate hills 68 in adjacent rows R in which the potatoes are grown. Essentially, each dished out shape at 66 is an upwardly opening V-shape that is aligned and dimensioned to dig out only a single hill 68 in a row R and break potatoes 50 from crowns. A blunt edge 70 on the blade 64 causes the soil around a potato cluster to shift, which in turn helps break clogs/lumps to break and snap the potatoes 50 from their vines V.

The apparatus 14 is preferably designed for two or four row operation, however this construction should not be viewed as limiting.

An upwardly facing surface 72 on the blade 64 guides unearthed potatoes 50 to the input location 30 defined at an upstream end of an endless conveyor assembly at 74 making up the first processing assembly 34. This transition between the blade 64 and conveyor assembly 74 can be controlled by changing the angular orientation of the blade 64. One portion of the blade 64, spanning laterally spaced subframe components 76, 78, is mounted for pivoting around a laterally extending axis 80. The pivoting is controlled by separate pins 82 (one shown), that are spaced from the pivot axis 80 and project one each outwardly through the subframe components 76, 78 and an elongate slot 84 therein which is configured to limit a range of pivoting for the blade 64. A desired angular relationship can be fixed by tightening a nut 86 on each pin 82.

The subframe 62 is mounted to the main frame 24 so that the leading end of the subframe 62 can pivot upwardly and downwardly, as indicated by the double-headed arrow 88. Pivoting is effected through extendable hydraulic cylinders 90 (one shown) acting between the main frame 24 and each of the subframe components 76, 78. The cylinders 90 are preferably "smart" cylinders incorporating and/or operatively interconnected with sensors/controls 92 to provide and maintain a constant digging depth. These components may also allow an operator to turn at the end of rows in a field and resume use of a previously selected digging depth.

Depth is also variable by using slides 94 to connect the subframe 62 to the main frame 24. The slides 94 allow the angled subframe 62 to shift oppositely along a line aligned with its length, as indicated by the double-headed arrow 96.

The position of the subframe 62 can also be controlled, as through a rock protection system at 97, that utilizes pressure relief components 98 that cause the subframe 62 to retract through the slides 94 relative to the main frame 24 in the direction of the arrow 99 and/or lift in the event an obstruction is encountered while the blade 64 and separate digger noses 100 on opposite sides of the blade 64 and subframe 62 are in contact with the underlying soil.

Through a main control 102, on the towing vehicle 42 and/or main frame 24, the subframe 62 can normally be translated through the slides 94 relative to the main frame 24, using a suitable drive 103, oppositely as indicated by the arrow 96 and/or angled upwardly and downwardly to maximize attack angle and depth to most efficiently unearth the potatoes 50 without damage thereto. The drive 103 may be powered by a main powering unit PTO on the towing vehicle 42 that is typically operated hydraulically. The powering unit PTO may power some, or essentially all, of the other operating components on the system 10.

The conveyor assembly 74 consists of a series of laterally extending, parallel rods 104 which are connected in conventional fashion to produce an endless shape that is driven in an endless path so that the rods 104 in the upper horizontal path portion define a surface to support the unearthed potatoes 50 and effect advancement thereof in the conveying direction indicated by the arrow 56. The rods 104 are connected to produce the endless shape by a plurality of reinforced rubber belts 105. The rods 104 are preferably steel rods with a variable spacing therebetween. The spacing is selected based upon soil type and condition.

The conveyor assembly 74 is driven in its endless path through a conventional type sprocket 106 turned by a drive 108 with a speed changeable through the main control 102.

With this construction, loose debris is allowed to separate from the conveying potatoes 50 and to move under its weight to between the rods 104 on the conveyor assembly 74 downwardly back into the field.

To facilitate debris separation, at least one shaker assembly 110 is provided on the subframe 62. Shaker assemblies 110 suitable for this purpose are currently commercially available. Typically, they are hydraulically operated. In one form, arms 112 on the shaker assembly support rollers 114 mounted so as to contact the bottom side of the rods 104 on the conveyor assembly 74. By causing the rollers 114 to oscillate, the rods 104 on the conveyor assembly 74 are caused to move or shake as they pass over the rollers 114. By controlling oil flow to the shaker assembly 110, the shaker assembly 110 is adjustable in terms of both speed and lift. The shaker action could be further changed by moving the shaker rollers 114 to different locations on the arms 112 and engaging different regions of the rods 104.

Separation is further enhanced along the first processing assembly 34 by incorporating a surface reconfiguring assembly at 116 into the first processing assembly 34 that functions in this embodiment as a rod mover. The surface reconfiguring assembly 116 has a frame assembly at 118 with laterally spaced frame parts 120, 122, that are pivotably connected to the subframe 62 for arcuate movement to thereby selectively raise and lower a series of rollers 124 supporting the conveyor assembly 74 as it moves in its endless path at the downstream end of the first processing assembly 34. This movement is effected by one or more hydraulic actuators 126 at the sides of the frame assembly 118. By pivoting the frame assembly 118 upwardly, the rollers 124 cause the rods 104 to locally change their path over a travel portion of the conveyor assembly 74 that supports the potatoes 50. This causes the rods 104 to at least one of: a) locally change direction of movement; and b) change a relationship with each other. In the latter case, a spacing between the rods 104 is locally changed from a spacing that the elongate rods 104 have upstream of the surface reconfiguring assembly 116.

With the rollers 124 raised over the travel portion of the conveyor assembly 74 at 128 which they underlie on the first processing assembly 34, a localized "hump" is formed. This hump makes it necessary for the advancing potatoes 50 and attached debris to change direction abruptly. This hump resists advancing movement of the potatoes and slows their travel speed which produces a scrubbing action that may break loose additional debris. Further, this hump also causes the spacing between the rods 104 to be locally increased, thereby to allow passage of larger size debris. This resistance, and resulting scrubbing, is increased by increasing the vertical rise of the hump.

The invention contemplates other configurations for the surface reconfiguring assembly. What is desirable is that the assembly be configured to change the relationship between a plurality of the elongate rods 104 to interrupt or change how the potatoes 50 and associated debris move and/or the size and nature of the debris that can pass between the rods 104 to accumulate in the field.

The processing assembly 36a cooperates directly with the processing assembly 36b in operation. The processing assembly 36a consists of a subframe 130 that supports rods 132 assembled similarly to the rods 104, to produce an endless conveyor assembly 134 with a sprocket operated by a drive 135. The rods 132 are preferably provided with a coating, such as rubber, so that contact of the rods 132 with the potatoes 50 does not tend to skin or bruise the same. Spacing between the rods 132 can be changed depending upon the nature of the soil and the debris. In the case of potatoes, it may be desirable to allow small potatoes to pass through the conveyor assembly 134, again to accumulate in the field. The conveyor assembly 134 moves in an endless path and conveys the potatoes 50 with the intermixed debris in the same fashion as the conveyor assembly 74.

The conveyor assembly 134 cooperates with an endless deviner assembly 136 that likewise has rods 138 joined to produce an endless component, with the same general configuration as the conveyor assemblies 74, 134. The spacing between the deviner rods 138 is again variable depending upon the nature of the product being processed and anticipated types of debris. Generally, the spacing between the rods 138 is significantly greater than the spacing between the rods 104, 132. A coating, of rubber or the like, is provided on the rods 138 and is preferably thicker than any coating on the rods 104, 132. The main purpose of the deviner assembly 136 is to convey primarily the vines V and other foliage away from the potatoes 50. Soil, and other loose debris generally will not follow the vines V in any significant volume up to and onto the deviner assembly 136.

The deviner assembly 136 moves in a path outside of the path of the conveyor assembly 134. As shown schematically in FIG. 9, the conveyor assembly 134 and deviner assembly 136 are held in place by a set of rollers, identified as nose rollers 140, that are situated directly under the downstream discharging end of the conveyor assembly 74.

The conveyor assembly 134 and deviner assembly 136 are guided in their endless paths by a series of rollers 142, 144. The rollers 142, 144, and other supporting structure, are arranged so that, as shown schematically in FIG. 10, the deviner assembly 136 bears downwardly directly against the conveyor assembly 134 at the upstream end 146 of the subframe 130 on the processing assembly 36a over a path portion PP, at which mixed potatoes 50 and debris are deposited from the first processing assembly 34. The rollers 144 supporting the deviner assembly 136 are larger in diameter than the rollers 142, as a result of which the rods 138 on the deviner assembly 136 will be shaken significantly as they impact the rollers 144 to break loose debris adhering relatively firmly to the conveying potatoes 50.

At the location 148 where the assemblies 134, 136 engage, potatoes 50 and attached debris delivered from the first processing assembly 34 are captured between the rods on the conveyor assembly 134 and deviner assembly 136. The rollers 142, 144 are arranged so that the deviner assembly 136 diverges away from the location at 148 as the deviner assembly 136 advances in the conveying direction 56. By causing the advancing deviner assembly 136 to depart from the location 148 at a relatively steep angle α, there is a rapid vertical movement of the potatoes and attached vines V. The potatoes attached to the vines V will hang down from the upper conveying region of the deviner assembly 136. In this state, as noted previously, the larger rollers 142 acting against the rods 138 will tend to produce a vibration/shock that tends to separate the potatoes 50 that will then move under their own weight downwardly to contact and be conveyed by the conveyor assembly 134 on the processing assembly 36a.

A shaker assembly 150, having the same general construction as the shaker assembly 110, is provided on the subframe 130 to interact with the conveyor assembly 134. The shaker assembly 150 performs the same function of enhancing debris removal from the conveying potatoes 50.

Each of the shaker assemblies 110, 150 may be configured to impart at least one of: a) a wave; and b) a vibrational movement to the moving elongate rods. Multiple shaker assemblies might be provided on each processing assembly 34, 36a.

The processing assembly 36b consists of at least one elongate blade 152 with a length extending transversely to the conveying path. In this embodiment, there are five (5) such blades 152 spaced equidistantly from each other in the conveying direction. However, the precise number of blades 152 is not critical to the present invention. Each of the blades 152 is in the form of a flat vane that resides substantially in a plane through which the conveying path extends. As depicted, each of the blades 152 is made up of two separate, laterally spaced, cooperating parts.

The blades 152 are maintained in an operative position by a support frame 154 which pivots about a laterally extending axis 156 to move in an arcuate path as indicated by the double-headed arrow 158. Through this pivoting action, the lower edges 160 of the blades 152, that are supported in a depending fashion, can be moved selectively towards and away from an upper supporting/conveying portion of the deviner assembly 136. The blades 152 extend over substantially the entire width of the conveying portion of the deviner assembly 136 to thereby intercept substantially the entire volume of conveying potatoes 50 with attached vines V and other debris. The primary function of the blades 152 is to engage the vines V intermixed with the conveying potatoes 50 to slow, but not block, movement of the engaged vines V as the potatoes 50 continue to advance in the conveying direction. The blades 152 are flexible, by reason of their shape and being made from rubber, or the like. They snag the vines V and bend to inhibit movement of the vines V as the deviner assembly 136 advances. This results in a scrubbing action that tends to break the potatoes 50 from the adhered vines V. What effectively occurs is that the advancing potatoes 50 tend to stretch the associated vine V hanging up on the blades 152 until the potatoes 50 are eventually snapped therefrom. Separated potatoes 50 thereafter move under their own weight to the conveying portion of the conveyor assembly 134 to be advanced downstream to the first point of use at 32.

In the embodiment shown, an hydraulically operated actuator 162 is used to reposition the support frame 154 around the axis 156. The position of the support frame 154 is controlled to determine the degree of scrubbing and may be changed based upon the nature of the product and debris that is being handled.

The processing assembly 36c may actually be considered to be a combination of two cooperating processing assemblies. Downstream of the processing assembly 36b, a plurality of elongate bars/rollers 164 is provided. Four such elongate bars/rollers 164 are depicted, although this number is not critical to the design. Each elongate bar/roller 164 has a length extending transversely to the conveying path. The elongate bars/rollers 164 support the deviner assembly 136 over a portion of its path. In the event that a potato 50 has not separated from its associated vine V at the processing assembly 36b, the deviner assembly 136 continues to convey the same; supporting the vine V with the potato suspended in depending fashion below the supporting/conveying portion of the deviner assembly 136. Continued advancement of the deviner assembly 136 causes the elongate bars/rollers 164 to engage the depending portion of the vine V, stretched under the weight of the potato, and eventually to reposition the vine V to directly engage the suspended potato, whereby a force is exerted thereupon tending to snap the potato from the vine V. This action is repeated at each of the elongate bars/rollers 164 to achieve thorough vine separation.

The processing assembly 36c utilizes an additional cooperation between components to effect separation of potatoes 50 from the vines V. One of the elongate bars/rollers 164 at the location A serves as one of the cooperating components. The other of the cooperating components is a roller 166 of larger diameter that is mounted upon an arm 168 that is spring biased to urge the roller 166 downwardly in an arcuate path, as indicated by the arrow 170, towards the downstream region of the elongate bar/roller 164 at the A location. Where surfaces on the elongate bar/roller 164 and roller 166 interact, a pinch region is formed. As the vine V advances, the roller 166 raises and lowers to produce a snap action that tends to pop off any potato 50 on a vine V at that location. Preferably each of the elongate bar 164 at A and cooperating roller 166 has a cylindrical outside diameter, with the surfaces thereat potentially engaging over the entire lateral width of the deviner assembly 136.

The redundant function of the processing assemblies 34, 36 described above minimizes the likelihood that any significant volume of usable potatoes 50 will follow the vines V to their ultimate disposal, as described below.

The processing assembly 36d is in the form of a fluid delivery system at 171. The fluid delivery system 171 is configured to direct fluid from a pressurized supply 172 in a fanned pattern through a plenum 173, generally in the direction of the arrows 174 in FIG. 3, thereby to advance the potatoes 50 towards the first point of use at 32 which, as depicted, is a cross conveying assembly 176 that is part of the conveying/transferring assembly 18. Preferably, the fluid delivery system 171 produces an "air knife" action that breaks additional debris loose and additionally causes separated light debris to be advanced further than the potatoes 50 to a region at 178 beyond the cross conveying assembly 176 for appropriate disposition. Mechanisms are well known to be incorporated into the pressurized supply 172 to generate the desired pressure and volume of fluid, that is preferably air. The pressurized supply 172 is supported preferably on the main frame 24 at a mid-length location, with appropriate conduits communicating fluid therefrom to the plenum 173. It is preferable that the residual debris is deposited progressively in the field as the apparatus 14 is advanced. At the same time, the air flow creates a cushion that avoids unimpeded dropping of the potatoes 50 to the cross conveying assembly 176. The plenum 173 preferably extends over substantially the entire width of a transitioning conveyor section 179 that delivers potatoes 50 from a downstream end of the processing assembly 36 to the cross conveying assembly 176.

Figure 12:
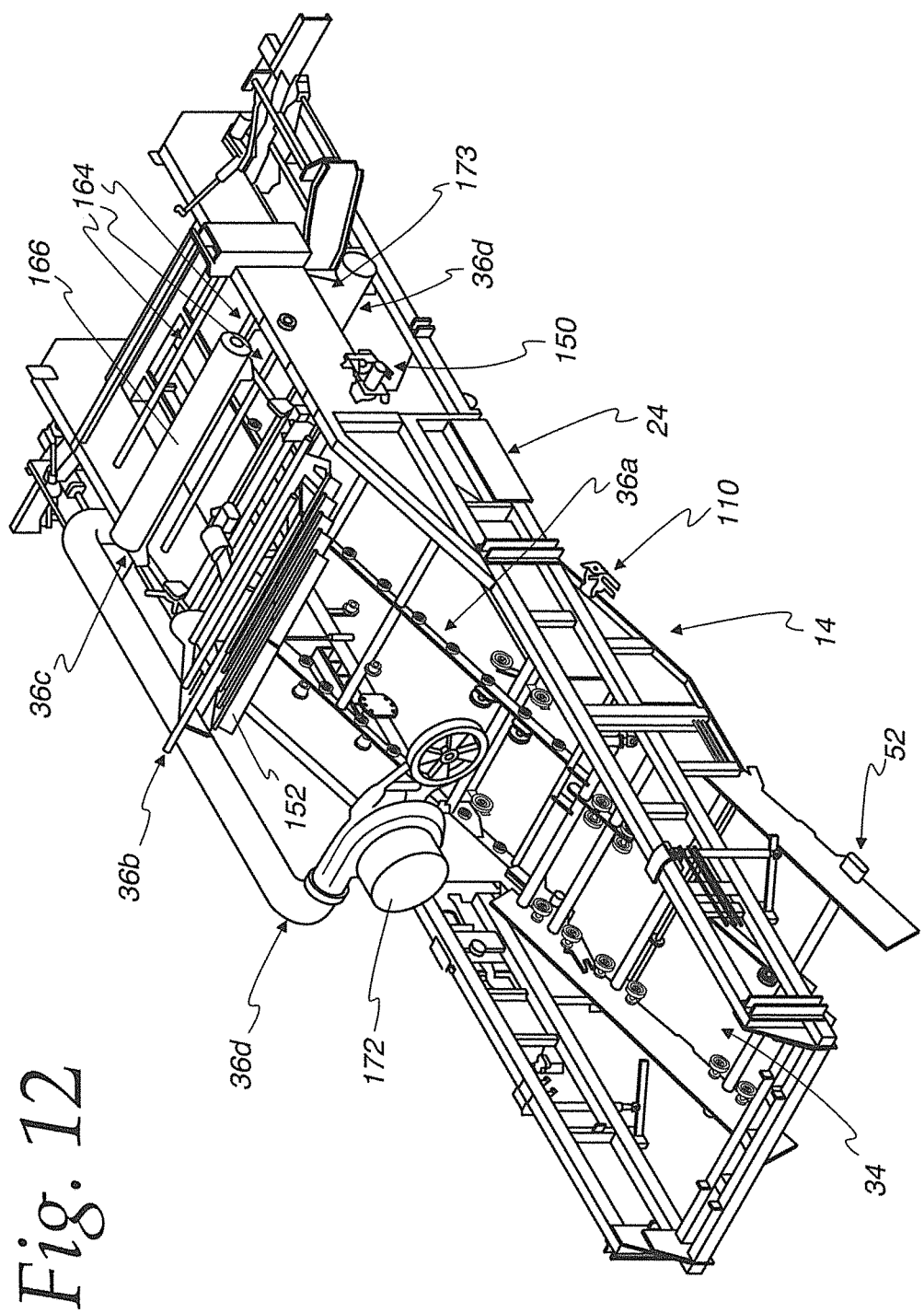
FIG. 12 is a perspective view of primarily a basic framework defining the processing/harvesting apparatus shown in FIGS. 3-11, with attached components removed.

For clarity, the basic structural framework of the main frame 24 and processing assemblies 34, 36 is shown in FIG. 12 with most other components removed.

The cross conveying assembly/conveyor 176 may deliver the processed potatoes 50 to a point of use at which they accumulate for later handling. More preferably, the cross conveying assembly 74 splits the flow of cleaned potatoes 50 for delivery to the relocating/accumulating assembly 22 as shown in detail in FIGS. 13 and 14. The cross conveying assembly 176 is integrated into the relocating/accumulating assembly 22 which in turn is integrated into the main frame 24 to move therewith as a unit.

The precise details of the conveying/transferring assembly 18 are not critical to the present invention. It suffices to say that separate support/conveying surfaces 180 and 182 are formed to provide a cushioned support through which cleaned potatoes 50 are advanced in opposite lateral directions, as indicated by the arrows 184, 186. The exemplary support/conveying surface 180 is defined by an endless member 188 trained in an endless path. The support/conveying surface 180 is defined by a plurality of elongate rods 190 that are in spaced relationship and cooperatively define a gripping/conveying surface. The rods 190 may have a coating on them so as not to cut or bruise the potatoes 50. The airstream from the fluid delivery system 172 also provides a cushion that allows the agricultural product/crop 50 to lower onto the surfaces 180, 182 with a lesser impact than if the airstream was absent to provide an additional safeguard against damage to the potatoes 50.

The relocating/accumulating assembly 22 consists of two operating units 192a, 192b, having substantially the same construction and which are mirror images of each other. For purposes of simplicity, only the exemplary unit 192a will be described in detail herein.

As noted above, each of the units 192 is integrated into the main frame 24. Wheeled supports 194 are provided to bear the additional weight of each unit 192.

The relocating/accumulating assembly 22 consists of an apparatus 196 for controlling relocation of the potatoes 50. The apparatus 196 in turn consists of a filling assembly 198 for individual totes 200 and a tote moving assembly at 202 that controls movement of the totes 200, to and away from, the filling assembly 198.

The relocating/accumulating assembly 22 further includes a conveyor assembly at 204 to transfer potatoes 50 from the cross conveying assembly 176 to the filling assembly 198.

Figure 13:
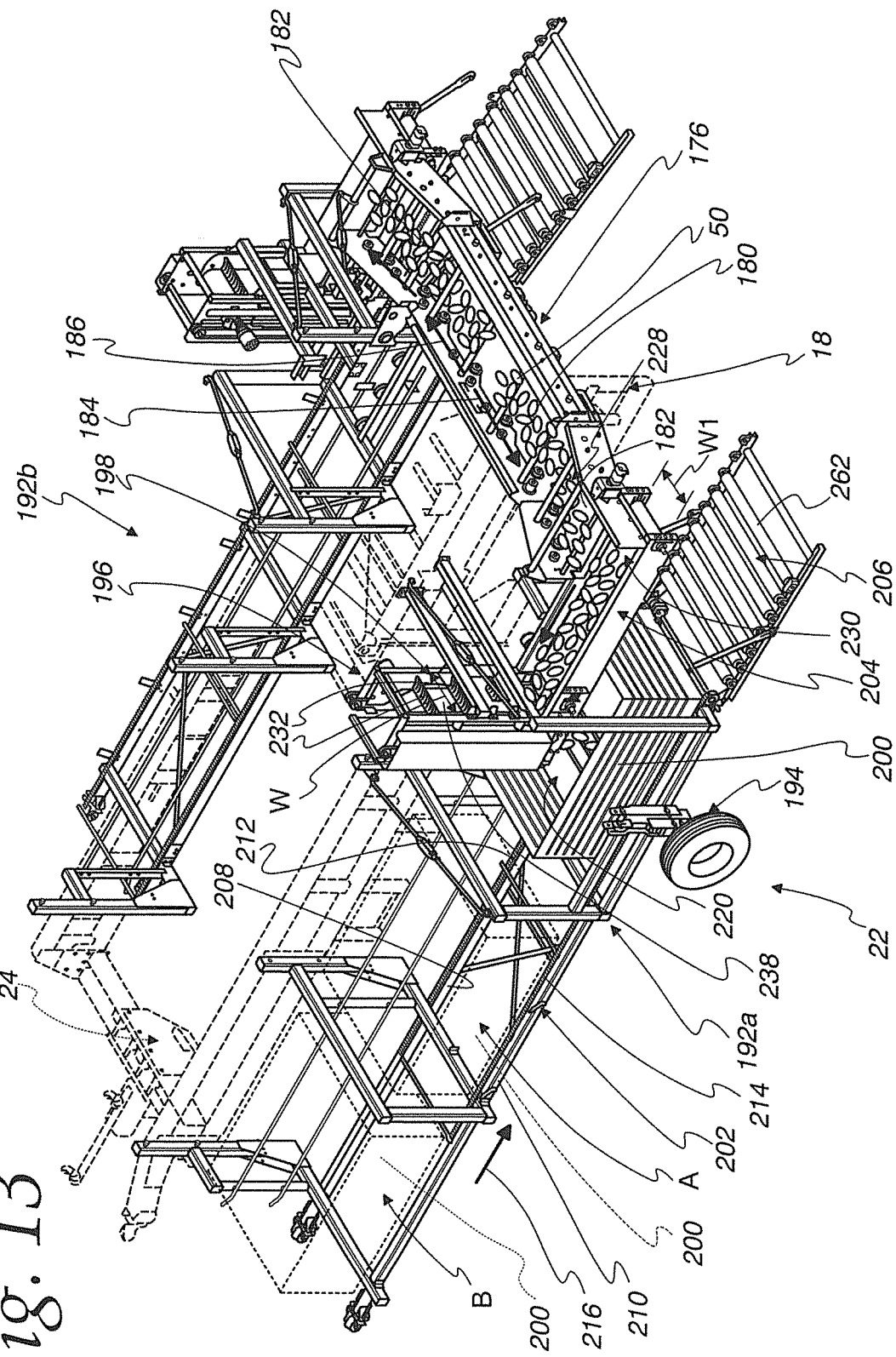
FIG. 13 is a perspective view of one specific form of conveying/transferring assembly and relocating/accumulating assembly as shown schematically in FIGS. 1 and 2.

The tote moving assembly 202, as depicted, accommodates three totes on the unit 192a, two of which are in non-active positions, with the third in an active loading position. The tote 200 in solid lines in FIG. 13 is in the loading position. The totes shown in dotted lines at the locations A and B are staged to be introduced serially to the loading position. The tote moving assembly 202 further includes a discharge ramp at 206.

The three totes 200 are supported on the unit 192a by a laterally spaced pair of rails 208, 210. Endless members 212, 214 are trained in endless paths on the rails 208, 210, respectively, so that the endless members 212, 214, when operated, advance the totes 200 in the direction of the arrow 216, which is opposite to the direction that the potatoes 50 move as they are processed by the apparatus 14. The members 212, 214 may directly support the totes 200 and either frictionally advance the totes 200 or be releasably joined thereto, as by cooperating connectors, so that the totes 200 follow movement of the members 212, 214. The members 212, 214 may each be made as a single component or in sections.

Figure 14:
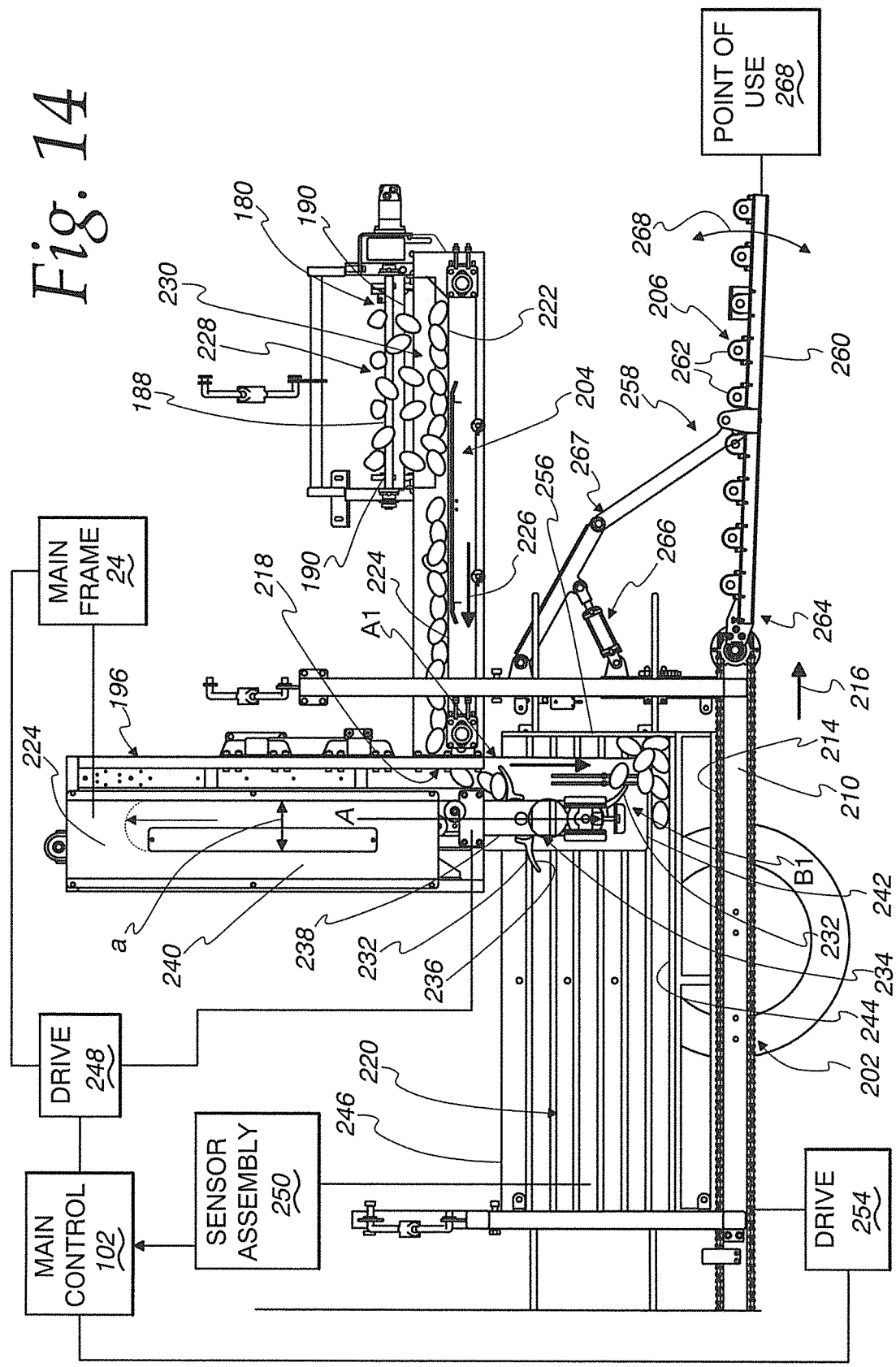
FIG. 14 is an enlarged, fragmentary, side elevation view of a portion of the conveying/transferring assembly and relocating/accumulating assembly where they cooperate to deliver cleaned agricultural product/crop to totes.

The tote 200 in the loading position, at the start of a filling operation, is situated as shown in FIG. 14, so that a discharge end 218 of the conveyor assembly 204 resides directly over an upwardly opening receptacle 220 defined by the tote 200. In this embodiment, the conveyor assembly 204 utilizes an endless, flexible belt 222 that defines an upwardly facing support surface 224 that advances in the direction of the arrow 226.

An inclined, downstream portion 228 of the conveying surface 180 continuously delivers the potatoes 50 from the cross conveying assembly 176 to a loading location 230 on the conveyor assembly 204.

The filling assembly 198 in turn transfers the potatoes 50 to the receptacle 220 of the tote 200 in the loading position. The filling assembly 198 has a plurality of product supports 232 and a support moving assembly 234 configured to cause the plurality of product supports 232 to move in a predetermined path between a receiving position, as shown for the product support 232 at the location A1, and a delivery position, as shown for the product support 232 at the location B1, that is below the location A1. While a specific configuration for the product supports 232 is shown, this particular configuration is exemplary in nature only. All that is required is that each product support 232 be configured: a) to support at least one potato 50 in the receiving position so that the supported potato 50 follows movement of the product support 232 from the receiving position towards the delivery position; and b) so that a potato 50 supported by the product support 232 in the receiving position is caused to separate from the product support 232 as an incident of the product support 232 moving from the receiving position into the delivery position. The product supports 232 each has a concave support surface 236 opening upwardly with the product support 232 in its receiving position.

The support moving assembly 234 includes an endless member 238 that is advanced to cause each of the product supports 232 to move in an endless path. In this embodiment, the endless member 238 is in the form of a flexible belt to which the product supports 232 are cantilever mounted. The endless path has an oval shape with a major axis A and a minor axis a. The major axis A is vertically oriented. The belt and the attached product supports 232 have a width W matched to the width W1 of the conveying support surface 224 on the conveyor assembly 204.

The filling assembly 198 has a frame 240 that is fixed relative to the main frame 24. The support moving assembly 234, to which the belt is attached, is movable vertically relative to the frame 240 along the major axis A.

The support moving assembly 234 has a bottom end 242. The support moving assembly 234 is movable relative to the frame 240 between: a) a lowermost position, shown in FIG. 14, wherein the bottom end 242 is slightly above a bottom surface 244 bounding the receptacle 220 of the tote 200 in the loading position; and b) a raised position. In the raised position, the bottom end 242 resides above a top edge 246 of the tote 200, whereby the tote 200 can be advanced up to and past the filling assembly 198 without any interference between the support moving assembly 234 and the tote 200. The support moving assembly 234 is selectively movable vertically relative to the frame 240 thereby to change a vertical relationship between the product supports 232, in their delivery position, and the bottom surface 244 of the tote 200.

The support moving assembly 234 is vertically repositioned by a drive 248 on the frame 240. A sensor assembly 250, that may take any number of different known configurations, is provided to sense the level of potatoes 50 accumulated in the receptacle 220 and generate a signal that is processed by the main control 102 that is programmed to raise or lower the support moving assembly 234 or maintain the same at a particular height in response to that signal. The control 102 operates the drive 248 based upon programmed parameters.

It is desirable to initially start with the support moving assembly 234 fully lowered. As the crop accumulates to a particular level, the sensor assembly 250 sends a signal to the main control 102 which causes the drive 248 to raise the support moving assembly 234.

This latter action is also coordinated with a drive 254 for the endless members 212, 214 on the rails 208, 210. This coordination is carried out as follows. Initially, the tote 200 in the loading position is situated as in FIG. 14, wherein the support moving assembly 234 is adjacent to the leading end 256 of the tote 200 to thereby fill a leading portion of the receptacle 220. As potatoes 50 are added, the sensor assembly 250, at some predetermined sensed level, causes the main control 102 to actuate the drive 248 to elevate the support moving assembly 234. This action repeats until the leading region of the tote receptacle 220 is filled. Thereafter, the main control 102 causes the drive 254 to operate to thereby shift the tote 200 in the direction of the arrow 216 whereupon the support moving assembly 234 aligns over a region of the tote receptacle 220 that has a lesser volume of accumulated potatoes 50. This action is repeated until the tote 200 is completely filled.

The sensor assembly 250 may be configured to operate in different ways. For example, the sensor assembly 250 may detect height of the accumulated potatoes 50. Alternatively, the sensor assembly 250 may operate by sensing the accumulated weight of the potatoes 50.

As noted above, the product supports 232 may have different configurations. As depicted, the concave support surfaces 236 in their receiving position open vertically, whereas in their delivery position they open horizontally. As a result, the supported potatoes 50 move under gravitational forces as the delivery position is realized to separate from the product supports 232.

Regardless of the particular details of construction, the apparatus is configured with a primary objective of minimizing drop distance for the potatoes 50, thereby to avoid bruising and skin damage.

Once the tote 200 in the loading position is filled, the drive 254 can be operated to advance the filled tote 200 to a lowering conveyor at 258 including the discharge ramp 206. The ramp has a support 260, with laterally extending, spaced rollers 262 thereon. The support 260 can be pivoted about its attached end 264 through an actuator 266 and associated linkage 267 in an arcuate path, as indicated at the double-headed arrow 268, to change ramp angle. With the support 260 at even a slight incline, advancing the filled tote 200 through operation of the drive 254 causes the filled tote placed against the rollers 262 to roll down the lowering conveyor 258 under its own weight onto the field without an abrupt drop. That is, the loaded tote 200 smoothly slides off of the lowering conveyor 258 onto the field for subsequent transportation to an appropriate location. The lowering conveyor 258 may cause tote delivery to the field or any other point of use 268.

At the same time that the loaded tote is offloaded, the empty upstream tote at the A location is moved into the loading position, wherein the support moving assembly 234 resides over the receptacle 220 defined thereby.

As noted above, each operating unit 192a, 192b operates in the same fashion so that the capacity of the unit 192a, as described, is essentially doubled by the depicted design.

For convenience, the locating/accumulating assembly 22 may be provided at the ends of fields, potentially allowing for the stocking of empty boxes in only two locations.

All components of the system 12 may be operated hydraulically for a self contained system capable of providing 60 GPM. Movements of conveyors and all other moving parts may be controlled by onboard computers, as directed by the main control 102, receiving inputs from numerous types of sensors. Operation using a 150-200 HP power source is contemplated.

The invention also contemplates use of other components/assemblies in conjunction with those described above. For example, a sizer assembly 274 as shown schematically in FIG. 1, may be utilized to continuously sort the potatoes 50 while they are being cleaned or after they are cleaned. The accumulated potatoes in the same size range may be strategically accumulated in the same tote for later handling. The filling of the totes with commonly sized potatoes may be carried out using the above-described components.

The foregoing disclosure of specific embodiments is intended to be illustrative of the broad concepts comprehended by the invention.

The invention claimed is:

1. An apparatus for processing agricultural product, the apparatus comprising:
    a main frame;
    a support for the main frame configured so that the main frame can be advanced in an operating direction over an area in which agricultural product is grown; and
    an operating system on the main frame configured to advance unearthed agricultural product intermixed with debris in a conveying direction in a conveying path between an input location and a first point of use,
    the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction,
    the operating system further comprising at least one additional crop processor downstream of the first crop processor configured to separate intermixed debris in the form of vines from the agricultural product as the agricultural product is advanced in the conveying direction between the first crop processor and the first point of use,
    wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction wherein the at least one elongate blade comprises first and second elongate blades each overlying the upwardly facing surface,
    wherein each of the first and second elongate blades is in the form of a flat vane that resides substantially in a plane through which the conveying path extends, the first and second elongate blades spaced fully from each other in the conveying direction with the planes of the flat vanes making up the first and second elongate blades substantially parallel to each other,
    the apparatus configurable so that the first and second elongate blades remain at fixed locations with respect to the main frame as the apparatus is operated.

2. The apparatus for processing agricultural product according to claim 1 wherein the at least one additional crop processor comprises a fluid delivery system configured to direct a pressurized supply of fluid against agricultural product advancing towards the first point of use.

3. The apparatus for processing agricultural product according to claim 1 wherein the first crop processor comprises a plurality of elongate rods in spaced relationship that cooperatively define a support surface, with upstream and downstream ends, for unearthed agricultural product intermixed with debris, the first crop processor configured so that the plurality of elongate rods are moved to advance supported unearthed agricultural product intermixed with debris in the conveying direction and so that separated debris can move under its weight downwardly through spaces between the elongate rods.

4. The apparatus for processing agricultural product according to claim 3 wherein the first crop processor further comprises a shaker assembly that is configured to impart at least one of: a) a wave and b) a vibrational movement to the moving elongate rods.

5. The apparatus for processing agricultural product according to claim 4 wherein the first crop processor further comprises at least one blade that is configured to penetrate soil and unearth agricultural product that is rooted in the soil as the main frame is advanced in the operating direction.

6. The apparatus for processing agricultural product according to claim 5 wherein the first crop processor comprises a subframe upon which the at least one blade and plurality of elongate rods are supported and the subframe and main frame are configured so that the subframe can be selectively moved relative to the main frame in a predetermined manner to change an orientation of the support surface.

7. The apparatus for processing agricultural product according to claim 6 wherein the at least one blade and subframe are configured so that the at least one blade can be moved selectively relative to the subframe to thereby change at least one of: a) a height; and b) an angular orientation of the at least one blade relative to the subframe.

8. The apparatus for processing agricultural product according to claim 3 wherein the apparatus further comprises a rod mover between and spaced from each of the upstream and downstream ends that is configured to interact with the plurality of moving elongate rods over a travel portion for supported agricultural products to cause the moving rods to change in relationship to each other to thereby change a spacing between the elongate rods from a spacing between the elongate rods upstream of the rod mover.

9. The apparatus for processing agricultural product according to claim 8 wherein the rod mover is configured so that a relationship between the plurality of elongate rods over the travel portion can be selectively varied.

10. The apparatus for processing agricultural product according to claim 1 wherein the operating system comprises an upper support surface and a lower support surface directly below the upper support surface, each of the upper and lower support surfaces configured to support agricultural product to be advanced toward the first point of use, the upper and lower support surfaces coextensive over at least a portion of lengths thereof along the conveying direction and diverging in a downstream direction.

11. The apparatus for processing agricultural product according to claim 1 wherein the operating system comprises a plurality of endless assemblies that each moves in a predetermined endless path and the plurality of endless assemblies cooperatively define support surfaces that advance agricultural product between the input location and first point of use.

12. The apparatus for processing agricultural product according to claim 11 wherein there are separate shaker assemblies that interact with at least one of: a) a same one of the endless assemblies; and b) different ones of the endless assemblies at locations spaced in the conveying direction, the shaker assemblies each configured to impart at least one of: i) a wave; and ii) a vibrational movement to the support surface on a respective endless assembly.

13. The apparatus for processing agricultural product according to claim 1 in combination with a cross conveyor at the first point of use configured to direct agricultural product delivered to the first point of use to a second point of use.

14. The apparatus for processing agricultural product according to claim 13 wherein the at least one additional crop processor comprises a fluid delivery system configured and located to direct a pressurized supply of fluid against agricultural product as the agricultural product is being delivered to the cross conveyor.

15. A method of processing agricultural product, the method comprising the steps of:
obtaining the apparatus of claim 1;
advancing the main frame in an operating direction to thereby cause in-ground agricultural product to be unearthed with intermixed debris including vines;
advancing the unearthed agricultural product with the intermixed vines towards the first point of use;
progressively separating the debris from the agricultural product through the first and at least one additional crop processor as the agricultural product intermixed with debris is advanced from the input location towards the first point of use including causing the first and second elongate blades to engage vines intermixed with advancing agricultural product to thereby inhibit movement of the engaged vines as the agricultural product continues to advance towards the point of use; and
causing the agricultural product with the intermixed debris separated by the first and at least one additional crop processor to be delivered to the first point of use.

16. The method of processing agricultural product according to claim 15 wherein the agricultural product comprises potatoes.

17. The method of processing agricultural product according to claim 15 wherein the agricultural product comprises sweet potatoes.

18. The apparatus for processing agricultural product according to claim 1 wherein the first elongate blade is supported in depending fashion.

19. The apparatus for processing agricultural product according to claim 18 wherein the first elongate blade is flexible.

20. The apparatus for processing agricultural product according to claim 1 wherein the first elongate blade is flexible.

21. An apparatus for processing agricultural product, the apparatus comprising:
a main frame;
a support for the main frame configured so that the main frame can be advanced in an operating direction over an area in which agricultural product is grown; and
an operating system on the main frame configured to advance unearthed agricultural product intermixed with debris in a conveying direction in a conveying path between an input location and a first point of use,
the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction,
the operating system further comprising at least one additional crop processor downstream of the first crop processor configured to separate intermixed debris in the form of vines from the agricultural product as the agricultural product is advanced in the conveying direction between the first crop processor and the first point of use,
wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction,
wherein the at least one additional crop processor comprises: a) a support surface configured to: i) support vines intermixed with the agricultural product so that the agricultural product is suspended by the vines on the support surface to reside beneath the support surface; and ii) move so as to advance the vines with the suspended agricultural product in the conveying direction; and b) at least one elongate bar with a length extending transversely to the conveying path and configured to engage the vines at a location beneath the support surface as the support surface moves to thereby reposition the vines to engage the suspended agricultural product and exert a force upon the suspended agricultural product tending to separate the suspended agricultural product from the vines.

22. An apparatus for processing agricultural product, the apparatus comprising:
a main frame;
a support for the main frame configured so that the main frame can be advanced in an operating direction over an area in which agricultural product is grown; and
an operating system on the main frame configured to advance unearthed agricultural product intermixed with debris in a conveying direction in a conveying path between an input location and a first point of use,
the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction,
the operating system further comprising at least one additional crop processor downstream of the first crop processor configured to separate intermixed debris in the form of vines from the agricultural product as the agricultural product is advanced in the conveying direction between the first crop processor and the first point of use,
wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction,
wherein the first crop processor comprises a) a support surface configured to: i) support vines intermixed with the agricultural product so that the agricultural product is suspended by the vines on the support surface; and ii) move so as to advance the vines with the suspended agricultural product in the conveying direction; and b) first and second components, each beneath the support surface, that have surfaces that cooperate to create a pinch region between the first and second component surfaces at which a force is exerted tending to separate the suspended agricultural product from the vines.

23. The apparatus for processing agricultural product according to claim 22 wherein one of the first and second components is configured to be biased toward the other of the first and second components.

24. The apparatus for processing agricultural product according to claim 23 wherein the first and second components each is elongate with a length extending transversely to the conveying path.

25. The apparatus for processing agricultural product according to claim 24 wherein the first and second components each is in the form of a generally cylindrical roller with an outside diameter and the outside diameters of the first and second components are different.

26. An apparatus for processing agricultural product, the apparatus comprising:
a main frame;
a support for the main frame configured so that the main frame can be advanced in an operating direction over an area in which agricultural product is grown; and
an operating system on the main frame configured to advance unearthed agricultural product intermixed with debris in a conveying direction in a conveying path between an input location and a first point of use,
the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction,
the operating system further comprising at least one additional crop processor downstream of the first crop processor configured to separate intermixed debris in the form of vines from the agricultural product as the agricultural product is advanced in the conveying direction between the first crop processor and the first point of use,
wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction,
wherein the operating system comprises an upper support surface and a lower support surface directly below the upper support surface,
each of the upper and lower support surfaces configured to support agricultural product to be advanced toward the first point of use,
the upper and lower support surfaces coextensive over at least a portion of lengths thereof along the conveying direction and diverging in a downstream direction,
wherein the upper and lower surfaces each is defined by an endless assembly each traveling in a predetermined path and the endless assemblies engage each other over a portion of their endless paths.

27. An apparatus for processing agricultural product, the apparatus comprising:
a main frame;
a support for the main frame configured so that the main frame can be advanced in an operating direction over an area in which agricultural product is grown; and
an operating system on the main frame configured to advance unearthed agricultural product intermixed with debris in a conveying direction in a conveying path between an input location and a first point of use,
the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction,
the operating system further comprising at least one additional crop processor downstream of the first crop processor configured to separate intermixed debris in the form of vines from the agricultural product as the agricultural product is advanced in the conveying direction between the first crop processor and the first point of use, wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction, wherein the at least one additional crop processor comprises a fluid delivery system configured and located to direct a pressurized supply of fluid against agricultural product as the agricultural product is being delivered to the cross conveyor, wherein the operating system comprises a moving support surface for agricultural product and intermixed debris that causes intermixed debris separated from the agricultural product to be advanced past the cross conveying assembly, the apparatus for processing agricultural product provided in combination with a cross conveyor at the first point of use configured to direct agricultural product delivered to the first point of use to a second point of use.

28. An apparatus for processing agricultural product, the apparatus comprising:

a main frame;

a support for the main frame configured so that the main frame can be advanced in an operating direction over an area in which agricultural product is grown; and an operating system on the main frame configured to advance unearthed agricultural product intermixed with debris in a conveying direction in a conveying path between an input location and a first point of use, the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction, the operating system further comprising at least one additional crop processor downstream of the first crop processor configured to separate intermixed debris in the form of vines from the agricultural product as the agricultural product is advanced in the conveying direction between the first crop processor and the first point of use, wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction, wherein the apparatus comprises at least one support surface for agricultural product intermixed with debris between the input location and point of use and the at least one additional crop processor comprises: a) a second crop processor comprising: i) at least one support surface configured to: A) support vines intermixed with the agricultural product so that the agricultural product is suspended by the vines; and B) move so as to advance the vines with the suspended agricultural product in the conveying direction; and ii) first and second components with surfaces that cooperate to create a pinch region at which a force is exerted tending to separate the suspended agricultural product from the vines; b) a third crop processor comprising: i) the at least one support surface configured to: A) support vines intermixed with the agricultural product so that the agricultural product is suspended by the vines; and B) move so as to advance the vines with the suspended agricultural product in the conveying direction; and ii) at least one elongate bar with a length extending transversely to the conveying path and configured to engage the vines at a location beneath the at least one support surface as the at least one support surface moves to thereby reposition the vines to engage the suspended agricultural product and exert a force upon the suspended agricultural product tending to separate the suspended agricultural product from the vines; and c) a fourth crop processor comprising a fluid delivery system configured to direct a pressurized supply of fluid against the agricultural product advancing towards the first point of use.

29. An apparatus for processing agricultural product, the apparatus comprising:

a main frame;

a support for the main frame configured so that the main frame can be advanced in an operating direction over an area in which agricultural product is grown; and an operating system on the main frame configured to advance unearthed agricultural product intermixed with debris in a conveying direction in a conveying path between an input location and a first point of use, the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction, the operating system further comprising at least one additional crop processor downstream of the first processing assembly configured to separate intermixed debris in the form of vines from the agricultural product as the agricultural product is advanced in the conveying direction between the first crop processor and the first point of use, wherein the at least one additional crop processor comprises: a) a support surface configured to: i) support vines intermixed with the agricultural product so that the agricultural product is suspended by the vines on the support surface; and ii) move so as to advance the vines with the suspended agricultural product in the conveying direction;

and b) first and second components with surfaces that cooperate to create a pinch region at which a force is exerted tending to separate the suspended agricultural product from the vines, the first and second component surfaces configured to be movable relative to each other during operation to change a size of the pinch region and so that as the vines advance the vines move between the first and second component surfaces.

30. The apparatus for processing agricultural product according to claim 29 wherein one of the first and second component surfaces is biased towards the other of the first and second component surfaces.

31. The apparatus for processing agricultural product according to claim 29 wherein the first and second component surfaces are each cylindrically shaped.

32. An apparatus for processing agricultural product, the apparatus comprising:
a main frame;
a support for the main frame configured so that the main frame can be advanced in an operating direction over an area in which agricultural product is grown; and
an operating system on the main frame configured to advance unearthed agricultural product intermixed with debris in a conveying direction in a conveying path between an input location and a first point of use,
the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction,
the operating system further comprising at least one additional crop processor downstream of the first crop processor configured to separate intermixed debris in the form of vines from the agricultural product as the agricultural product is advanced in the conveying direction between the first crop processor and the first point of use,
wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction wherein the at least one elongate blade comprises first and second elongate blades,
wherein each of the first and second blades is mounted in depending fashion respectively at first and second locations that are fixed with respect to the main frame and is in the form of a flat vane that resides substantially in a plane through which the conveying path extends so that the vines intermixed with the conveying agricultural product move against a flat surface on the at least one elongate blade facing oppositely to the conveying direction.

33. An apparatus for processing agricultural product, the apparatus comprising:
a main frame;
a support for the main frame configured so that the main frame can be advanced in an operating direction over an area in which agricultural product is grown; and
an operating system on the main frame configured to advance unearthed agricultural product intermixed with debris in a conveying direction in a conveying path between an input location and a first point of use,
the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction,
the operating system further comprising at least one additional crop processor downstream of the first crop processor configured to separate intermixed debris in the form of vines from the agricultural product as the agricultural product is advanced in the conveying direction between the first crop processor and the first point of use,
wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction wherein the at least one elongate blade comprises first and second elongate blades spaced fully from each other in the conveying direction and respectively downwardly projecting at substantially fixed first and second locations with respect to the main frame as the apparatus is operated,
the first and second elongate blades respectively having first and second flat surfaces that face in a same direction to engage vines intermixed with the conveying agricultural product above the advancing upwardly facing surface.

34. An apparatus for processing agricultural product, the apparatus comprising:
a main frame;
a support for the main frame configured so that the main frame can be advanced in an operating direction over an area in which agricultural product is grown; and
an operating system on the main frame configured to advance unearthed agricultural product intermixed with debris in a conveying direction in a conveying path between an input location and a first point of use,
the operating system comprising a first crop processor that is configured to: a) advance unearthed agricultural product intermixed with debris in the conveying direction towards the first point of use; and b) allow debris intermixed with the agricultural product to separate from the agricultural product as it is advanced in the conveying direction,
the operating system further comprising at least one additional crop processor downstream of the first crop processor configured to separate intermixed debris in the form of vines from the agricultural product as the agricultural product is advanced in the conveying direction between the first crop processor and the first point of use,
wherein the at least one additional crop processor comprises an upwardly facing surface for supporting conveying agricultural product and that is advanced relative to the main frame to convey supported agriculture product in the conveying direction towards the first point of use and at least one elongate blade with a length extending transversely to the conveying path, the at least one elongate blade configured to: a) engage vines intermixed with the conveying agricultural product at a location above the advancing upwardly facing surface; and b) inhibit movement of the engaged vines as the agricultural product continues to advance in the conveying direction, wherein the at least one elongate blade comprises first and second elongate blades each mounted in a depending fashion and in fixed relationship to the main frame so as to engage advancing vines and flexible sufficiently to be bent by the conveying vines to thereby allow passage of the vines thereby.

* * * * *